(12) United States Patent
Ichihashi

(10) Patent No.: US 8,373,906 B2
(45) Date of Patent: Feb. 12, 2013

(54) IMAGE PROCESSING APPARATUS AND IMAGE PROCESSING METHOD

(75) Inventor: Yukichika Ichihashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 964 days.

(21) Appl. No.: 12/429,992

(22) Filed: Apr. 24, 2009

(65) Prior Publication Data
US 2009/0284805 A1 Nov. 19, 2009

(30) Foreign Application Priority Data

May 13, 2008 (JP) .................. 2008-126453

(51) Int. Cl.
*G06F 3/12* (2006.01)
*H04N 1/387* (2006.01)
*H04N 1/40* (2006.01)
*H04N 1/04* (2006.01)
*H04N 1/46* (2006.01)

(52) U.S. Cl. ........ 358/448; 358/528; 358/540; 358/450; 358/1.13; 358/474

(58) Field of Classification Search .......... 358/528, 358/530, 540, 532, 448, 443, 450–452, 471, 358/474, 1.13
See application file for complete search history.

(56) References Cited

U.S. PATENT DOCUMENTS

| | | | | |
|---|---|---|---|---|
| 5,608,543 A | * | 3/1997 | Tamagaki et al. | 358/450 |
| 6,587,602 B2 | * | 7/2003 | Wakisawa et al. | 382/298 |
| 6,681,056 B1 | * | 1/2004 | Tseng et al. | 382/282 |
| 7,876,477 B2 | * | 1/2011 | Toma et al. | 358/474 |
| 2006/0038891 A1 | | 2/2006 | Okutomi et al. | |
| 2007/0098301 A1 | | 5/2007 | Rengakuji et al. | |

FOREIGN PATENT DOCUMENTS

| | | |
|---|---|---|
| JP | 07-245698 A | 9/1995 |
| JP | 10-164323 A | 6/1998 |
| JP | 2000-285228 A | 10/2000 |
| JP | 2000-309132 A | 11/2000 |
| JP | 2004-005726 A | 1/2004 |
| JP | 2007-151080 A | 6/2007 |
| JP | 2007-265130 A | 10/2007 |
| WO | 2004-068862 A | 8/2004 |

OTHER PUBLICATIONS

Japanese Office Action dated Mar. 12, 2012 concerning Japanese Patent Application No. 2008-126453.

* cited by examiner

*Primary Examiner* — Twyler Haskins
*Assistant Examiner* — Jonathan Beckley
(74) *Attorney, Agent, or Firm* — Fitzpatrick, Cella, Harper & Scinto

(57) ABSTRACT

This invention has as its object to generate image data having a desired resolution by a small footprint upon execution of resolution conversion processing in an image processing apparatus having an area image sensor. This invention is an image processing method for processing a plurality of image data which have phase shifts in the main scanning direction and sub scanning direction, including a step of inputting a target resolution, a step of executing super-resolution processing for respective positions using image data, corresponding to each position of the document in the sub scanning direction, of the plurality of image data, and a step of further executing variable-magnification processing of the image data which has undergone the super-resolution processing at that position when the resolution of the image data executed super-resolution processing is lower than the target resolution.

7 Claims, 19 Drawing Sheets

F I G. 4
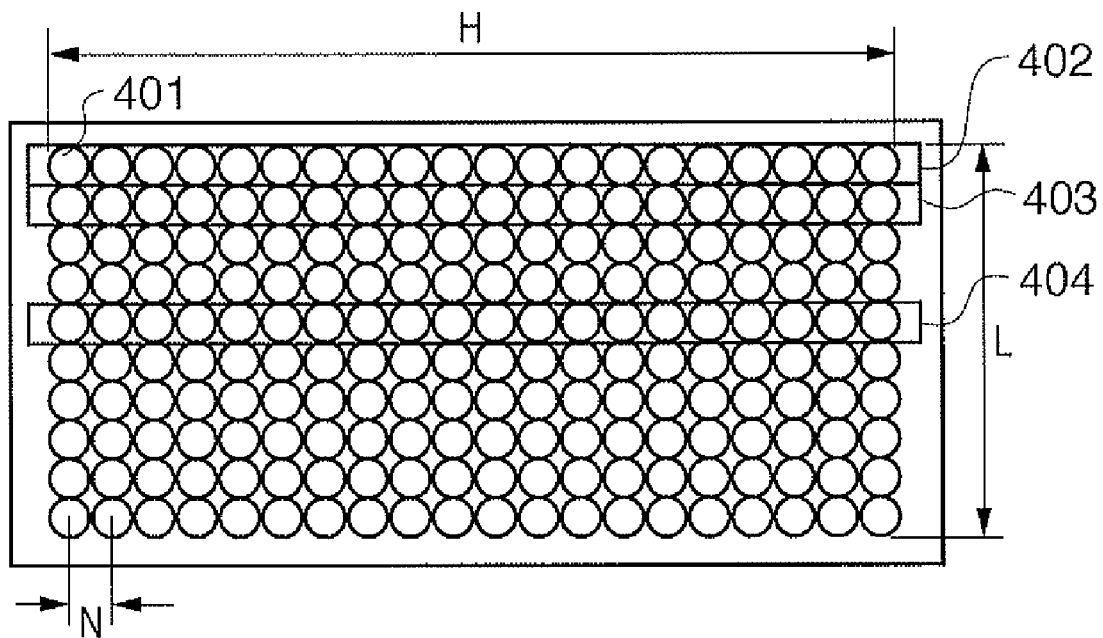
F I G. 5
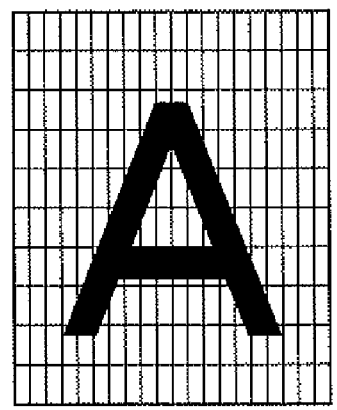

◇ PIXEL OF TARGET LOW-RESOLUTION IMAGE
● SUPER-RESOLUTION PROCESSING TARGET PIXEL

| SUB SCANNING POSITION | hmag |
|---|---|
| 0 | 100dpi |
| 1 | 150dpi |
| 2 | 160dpi |
| . | |
| . | |
| . | |
| 10 | 2400dpi |
| . | |
| . | |
| . | |
| 21 | 150dpi |
| 22 | 100dpi |

19b

| SUB SCANNING POSITION | vmag |
|---|---|
| 0 | 100dpi |
| 1 | 150dpi |
| 2 | 160dpi |
| . | |
| . | |
| . | |
| 10 | 2400dpi |
| . | |
| . | |
| . | |
| 21 | 150dpi |
| 22 | 100dpi |

FIG. 20
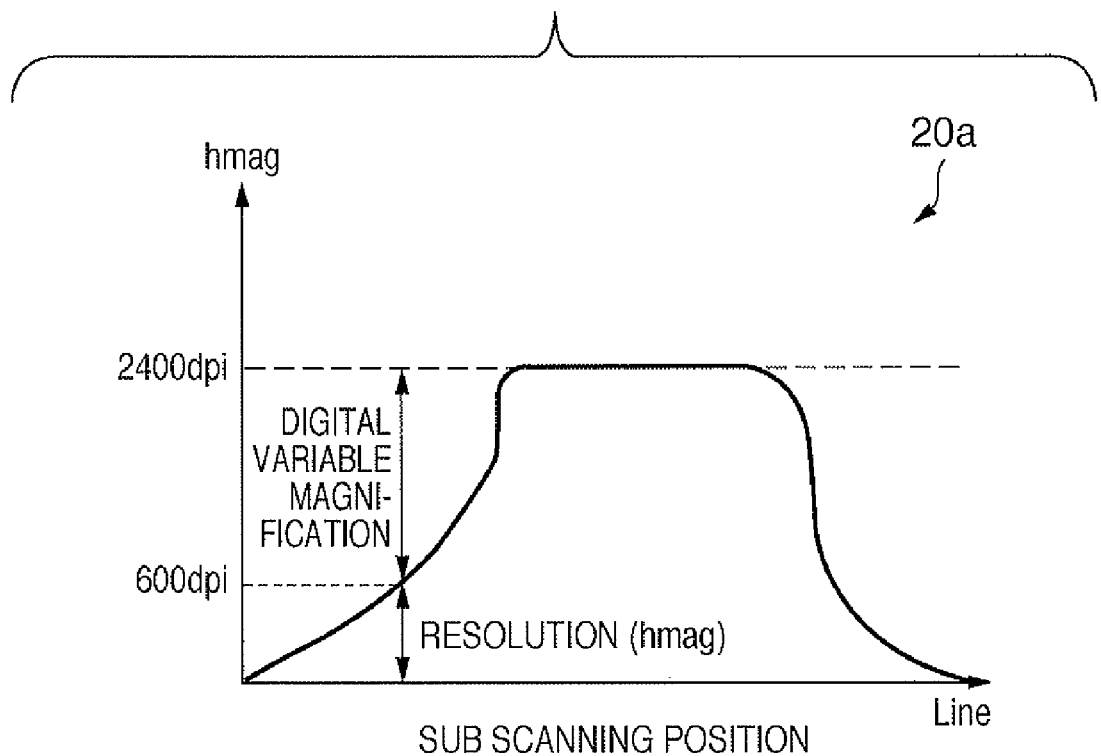
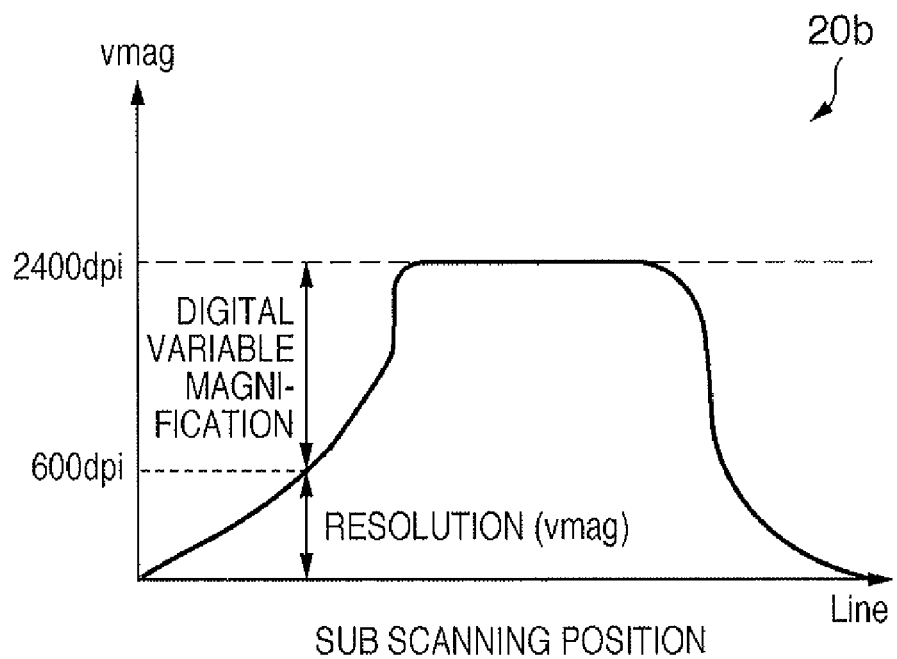

IMAGE PROCESSING APPARATUS AND IMAGE PROCESSING METHOD

BACKGROUND OF THE INVENTION

1. Field of the Invention

The present invention relates to an image processing apparatus and image processing method.

2. Description of the Related Art

Conventionally, as one of resolution conversion functions, a super-resolution processing technique which generates high-resolution image data from a plurality of low-resolution image data is known. With this technique, even image data acquired by a low-resolution device can be converted into high-resolution image data (for example, see Japanese Patent Laid-Open No. 2007-151080).

However, upon using the super-resolution processing technique, a plurality of low-resolution image data which have phase shifts for sub-pixel units (a unit smaller than one pixel) have to be prepared, thus taking much time for preprocessing. For this reason, the use of the super-resolution processing technique is limited to a specific field that requires high-quality image data such as moving image data sensed by a digital video camera and still image data sensed by a digital camera (for example, see WO2004/068862).

However, recently, the field of image processing apparatuses such as a copying machine and facsimile apparatus requires high-quality image data. Hence, application of the super-resolution processing technique to this field has been contemplated.

Note that the image processing apparatuses such as a copying machine and facsimile apparatus normally read document images line-sequentially, and use a CCD line sensor, contact image sensor, and the like as reading devices.

However, in recent years, popularization of digital cameras accelerates a price reduction of CCD area image sensors, and image processing apparatuses such as a copying machine and facsimile apparatus use CCD area image sensors.

For this reason, upon application of the super-resolution processing technique to an image processing apparatus, it is desirable to assume a case in which a CCD area image sensor is used as a reading device.

The CCD area image sensor senses images for respective frames (to simultaneously acquire image data in the main scanning and sub scanning directions) normally (when it is used in, e.g., a digital video camera).

However, when super-resolution processing is executed in an image processing apparatus such as a copying machine or facsimile apparatus, the CCD area image sensor is moved in the sub scanning direction so as to efficiently acquire a plurality of phase-shifted image data.

Then, image data obtained in this way are processed for respective lines which form the CCD area image sensor in place of frames. With this processing, phase-shifted image data as many as the number of lines can be acquired by a single operation in the sub scanning direction.

At this time, when the operation range of the CCD area image sensor is limited to that within a document size, regions on a document covered by obtained image data as many as the number of lines cannot be uniformly obtained. That is, the number of regions on the document covered by the obtained image data is large on a central part of the document, but it is small on the upstream and downstream parts of the document.

Practical examples will be described below with reference to FIGS. 24 and 25. For example, assume that a size for one frame of the CCD area image sensor is defined by the main scanning direction=290 mm and the sub scanning direction=200 mm. When the CCD area image sensor is located at the uppermost stream position, a region from the top end of the document to a 200-mm position which is the same as the size for one frame in the sub scanning direction is covered by the first frame.

When the CCD area image sensor is moved by 10 mm in the sub scanning direction, a region from a 10-mm position from the uppermost stream position to a 210-mm position is covered by the second frame.

Upon comparison between these two image data (those of the first and second frames), only one image data covers the part from the uppermost stream position to the 10-mm position of the document. On the other hand, the two image data cover the part from the 10-mm position to the 200-mm position of the document (see FIG. 24).

As a result of movement of the CCD area image sensor within the range of the document size, image data as many as the number of lines are obtained, as shown in 25a in FIG. 25. That is, a part covered by a large number of image data and that covered by a small number of image data are inevitably generated (25b in FIG. 25).

In this way, when the operation range of the CCD area image sensor is limited to that within the document size, the data amounts of image data of the upstream and downstream parts in the sub scanning direction become small. Conversely, the data amount of image data increases toward the central part in the sub scanning direction.

In this case (when image data shown in 25a in FIG. 25 are used), even when the super-resolution processing is executed, image data having a desired resolution cannot be obtained.

On the other hand, in order to avoid such situation, the operation range of the CCD area image sensor may be expanded to be larger than the range of the document size. However, when the operation range of the CCD area image sensor is expanded, the image processing apparatus undesirably becomes bulky.

SUMMARY OF THE INVENTION

The present invention has been made in consideration of the aforementioned problems.

An image processing apparatus according to the present invention comprises the following arrangement. That is, an image processing apparatus for processing a plurality of image data whose reading positions are displaced in a main scanning direction and a sub scanning direction upon reading a document, comprising: an inputting unit configured to input a target resolution; a super-resolution processing unit configured to execute super-resolution processing for respective positions using image data, corresponding to each position of the document in the sub scanning direction, of the plurality of image data; and a variable-magnification processing unit configured to further execute variable-magnification processing of the image data, which has undergone the super-resolution processing at that position, when the resolution of the image data executed super-resolution processing by the super-resolution processing unit is lower than the resolution input by the inputting unit.

An image processing method according to the present invention comprises the following arrangement. That is, an image processing method in an image processing apparatus for processing a plurality of image data whose reading positions are displaced in a main scanning direction and a sub scanning direction upon reading a document, comprising: an inputting step of inputting a setting of a target resolution; a super-resolution processing step of executing super-resolution processing for respective positions using image data, corresponding to each position of the document in the sub scanning direction, of the plurality of image data; and a variable-magnification processing step of further executing variable-magnification processing of the image data, which has undergone the super-resolution processing at that position, when the resolution of the image data executed super-resolution processing in the super-resolution processing step is lower than the resolution input in the inputting step.

According to the present invention, upon execution of resolution conversion in an image processing apparatus using an area image sensor, image data having a desired resolution can be generated with a small footprint.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing the arrangement of a general CCD area image sensor;

FIG. 5 is a view showing an example of image data of a document to be read;

FIG. 19 describes resolutions at the main scanning and sub scanning positions;

FIG. 20 shows the ratio of resolution conversion;

DESCRIPTION OF THE EMBODIMENTS

Embodiments of the present invention will now be described in detail in accordance with the accompanying drawings.

First Embodiment

1. Arrangement of Image Processing Apparatus

Figure 1:
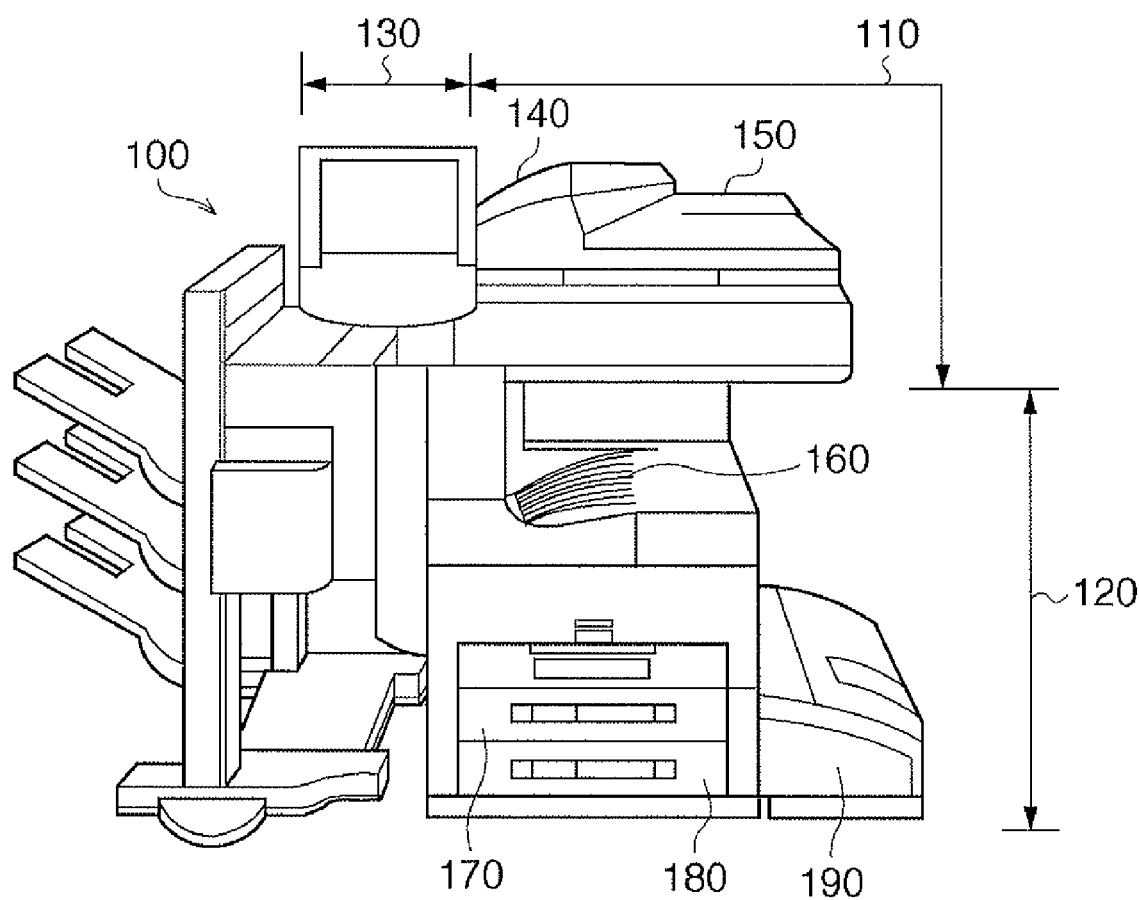
FIG. 1 is a view showing the outer appearance of an image processing apparatus 100 according to the first embodiment of the present invention.

FIG. 1 is a view showing the outer appearance of an image processing apparatus 100 according to the first embodiment of the present invention. The image processing apparatus 100 roughly includes a scanner unit 110 which generates image data by reading a document image, a printer unit 120 which prints the generated image data, and an operation unit 130 which allows the user to make various operation settings of the image processing apparatus 100.

The scanner unit 110 converts reflected light obtained by exposing and scanning a document into an electrical signal by inputting the reflected light to a CCD area image sensor. The scanner unit 110 converts the electrical signal into luminance signals of R, G, and B colors, and outputs the luminance signals as image data to a controller (to be described later).

Note that documents are set on a tray 140 of a document feeder 150. When the user inputs a document reading instruction from the operation unit 130, the controller supplies the document reading instruction to the scanner unit 110.

Upon reception of this instruction, the scanner unit 110 reads document images by feeding the documents from the tray 140 of the document feeder 150 one by one. Note that the document reading method is not limited to an automatic feeding method using the document feeder 150. For example, a document may be placed on a glass surface (not shown), and may be read by moving a reading optical unit.

The printer unit 120 prints image data received from the controller on a paper sheet. In the following description of this embodiment, an electrophotography method using a photosensitive drum or belt is used as an image processing method. However, the present invention is not limited to such specific method. For example, an ink-jet method that prints an image on a print sheet by ejecting inks from a micro nozzle array may be used.

The printer unit 120 includes a plurality of paper cassettes 170, 180, and 190, which allow the user to select different paper sizes or paper orientations. Note that printed paper sheets are discharged onto a discharge tray 160.

2. Arrangement of Scanner Unit 110

Figure 2:
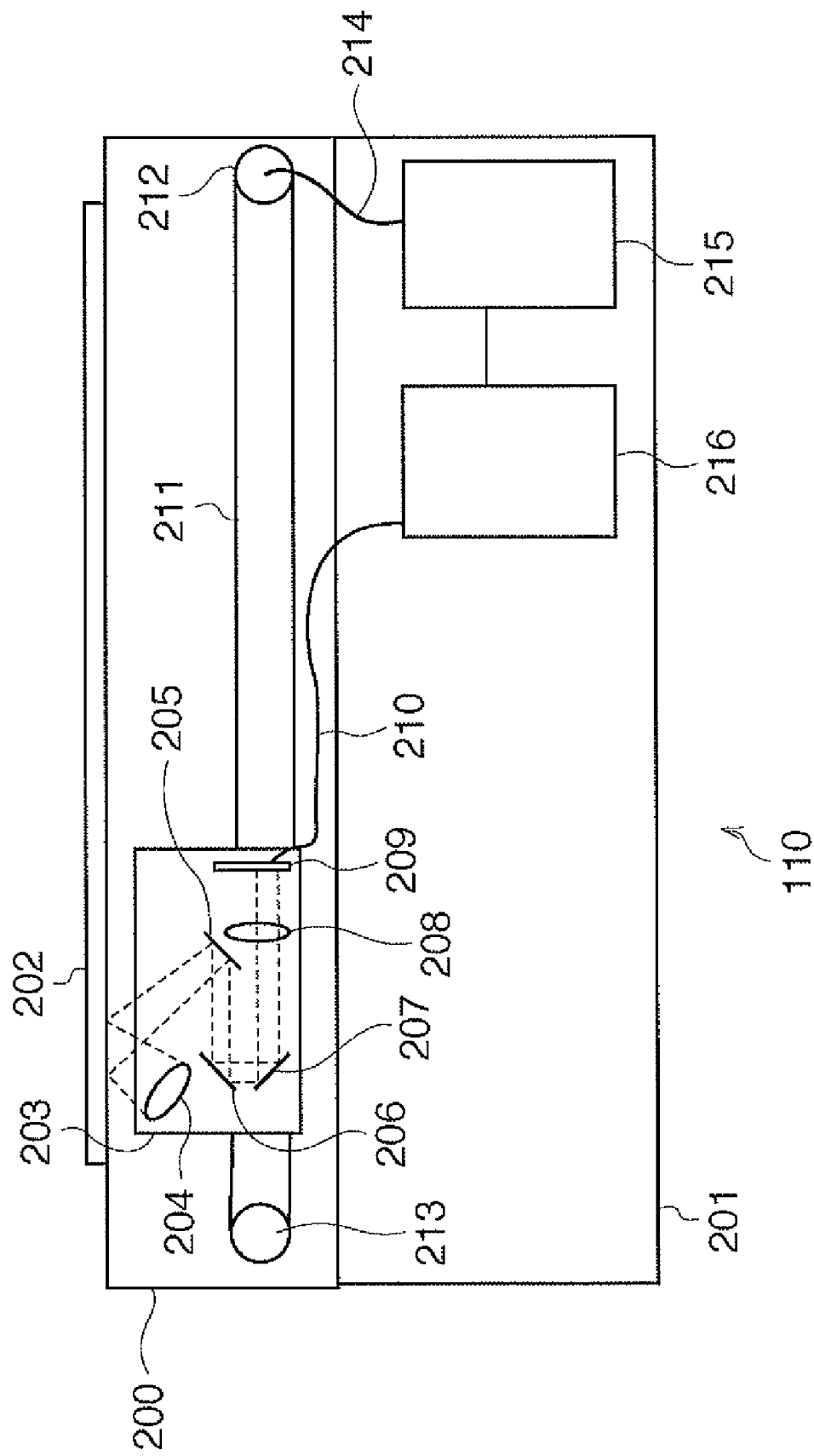
FIG. 2 is a view showing the arrangement of a scanner unit 110.

FIG. 2 is a view showing the arrangement of the scanner unit 110. In FIG. 2, reference numerals 200 and 201 denote a housing of the scanner unit 110. Reference numeral 203 denotes an integrated reading optical unit, which includes an illumination device 204, reflection mirrors 205 to 207, lens 208, and CCD area image sensor 209.

The CCD area image sensor 209 is preferably installed by an installation method suited to generate image data used in super-resolution processing. However, since a method of generating image data used in super-resolution processing by a placing method of a document or by processing in an optical path is available, the installation method suited to generate image data used in super-resolution processing need not always be adopted.

The reading optical unit 203 is configured to move in the sub scanning direction when a conveyor belt 211 and pulley 213 are driven by a stepping motor 212. In this embodiment, the illumination device 204 emits light toward a document on a document table 202 while the reading optical unit 203 moves in the sub scanning direction.

From the document on the document table 202, which is irradiated with light coming from the illumination device 204, reflected light is input, and is received by the CCD area image sensor 209 via the reflection mirrors 205 to 207 and lens 208. With this arrangement, a document image can be read by moving the reading optical unit 203 within a light-receiving area (for example, 290 mm in the main scanning direction×200 mm in the sub scanning direction) of the CCD area image sensor 209.

The stepping motor 212 is connected to a motor driving control circuit 215 via a cable 214, and is controlled by the motor driving control circuit 215. Image data generated by the CCD area image sensor 209 is output to a controller 216 via a cable 210.

3. Internal Arrangement of Controller 216

Figure 3:
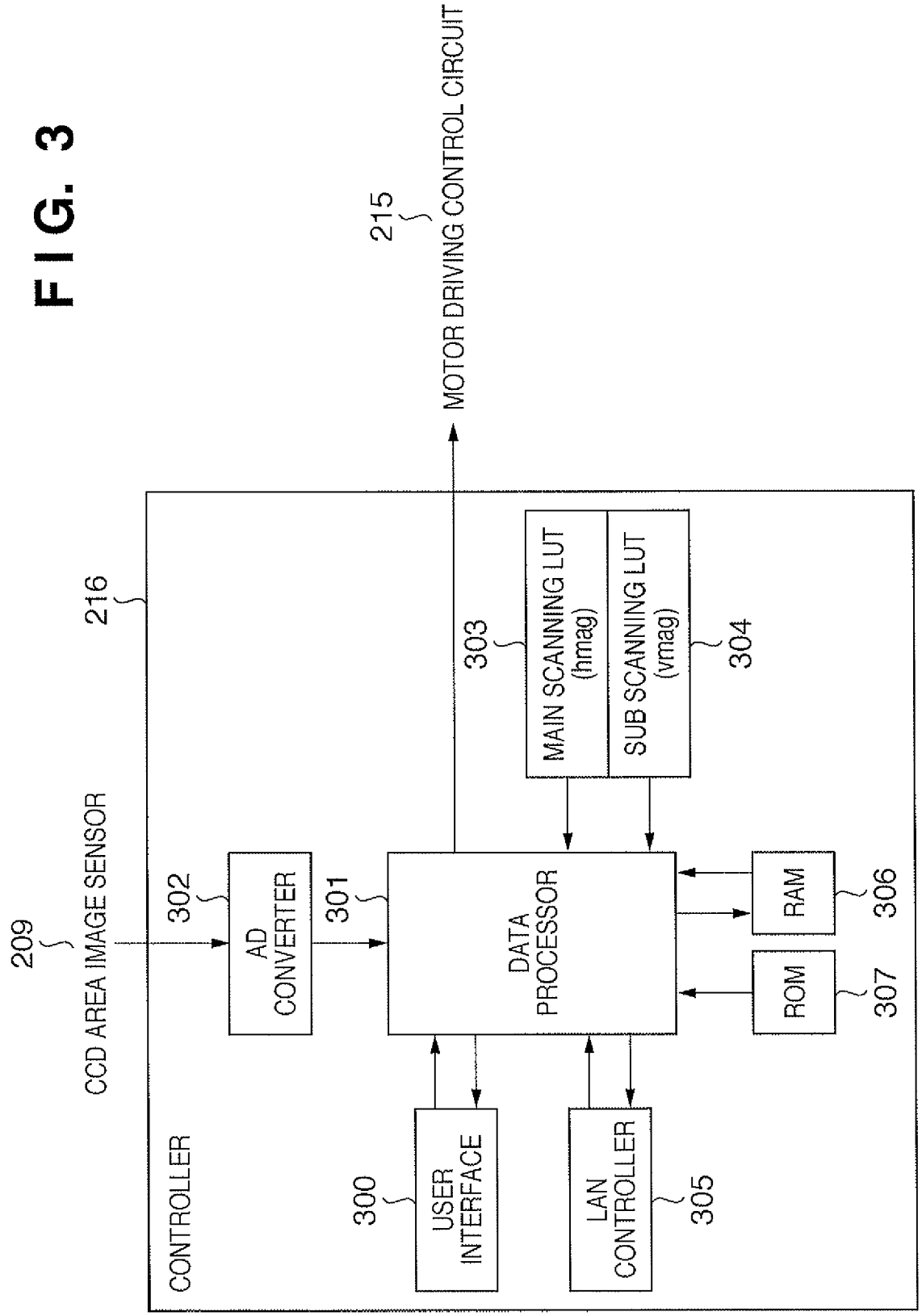
FIG. 3 is a block diagram showing the internal arrangement of a controller 216.

The internal arrangement of the controller 216 will be described in detail below with reference to FIG. 3. In FIG. 3, reference numeral 300 denotes a user interface which inputs a user's instruction via a user panel or the like, and transfers a command to a data processor 301. In the image processing apparatus 100 according to this embodiment, a document reading instruction, a target resolution selection instruction, and the like to the scanner unit 110 are input via the user interface 300.

The data processor 301 executes resolution conversion processing including super-resolution processing and variable-magnification processing, and outputs a control instruction to the motor driving control circuit 215. Also, the data processor 301 transfers image data to a LAN controller 305 and receives a command from the user interface 300.

Furthermore, the data processor 301 is connected to a RAM 306, ROM 307, main scanning lookup table 303, and sub scanning lookup table 304, and exchanges commands required to execute the resolution conversion processing with these components. The data processor 301 receives image data which is transmitted from the CCD area image sensor 209 and is converted into digital data by an A/D converter 302.

4. Details of CCD Area Image Sensor 209

Details of the CCD area image sensor 209 will be described below.

4.1 Pixel Sensor Layout of CCD Area Image Sensor

The CCD area image sensor 209 is the same as a sensor applied to digital cameras and the like, and is different from a line sensor used in the conventional image processing apparatus. More specifically, pixel sensors used to read a document image are two-dimensionally laid out in the main scanning direction and sub scanning direction.

Note that the main scanning direction agrees with a direction perpendicular to the moving direction of the reading optical unit 203 with respect to a document upon reading the document placed on the document table 202 by the scanner unit 110. On the other hand, the sub scanning direction agrees with a direction parallel to the moving direction of the reading optical unit 203.

FIG. 4 is a view showing the arrangement of a general CCD area image sensor. Referring to FIG. 4, reference numeral 401 denotes a pixel sensor which configures the CCD area image sensor. H pixels are laid out in the main scanning direction, and L pixels are laid out in the sub scanning direction. The resolution of the CCD area image sensor is determined by a distance N between neighboring pixel sensors.

4.2 Installation Method and Image Sensing Processing Method of CCD Area Image Sensor The installation method and image sensing processing method of the CCD area image sensor 209 in the image processing apparatus 100 according to this embodiment will be described below. In the following description, in order to clarify characteristic features of the image processing apparatus 100 according to this embodiment, the installation method and image sensing processing method of a CCD area image sensor in a general digital camera and general image processing apparatus will be described first.

(1) In Case of General Digital Camera

When a CCD area image sensor is used in a digital camera or the like, it senses an image by capturing input image data as a two-dimensional region. That is, the CCD area image sensor uses all pixel sensors, which are two-dimensionally laid out, in a single image sensing operation.

The CCD area image sensor is installed, so that the pixel sensors are laid out without any tilt to generate sensed image data free from any distortions in the horizontal and vertical directions.

For example, when a CCD area image sensor is installed in a general digital camera, an image sensing target read by pixel sensors in a line bounded by a black frame 402 in FIG. 4 forms a topmost end part of the image sensing target. In this case, generated image data has no tilt with respect to a direction that defines the line.

Likewise, an image sensing target read by pixel sensors in a line bounded by a black frame 403 forms a position different from the image sensing target position read by the pixel sensors in the line bounded by the black frame 402, i.e., a position immediately below that position in the vertical direction. Also, an image sensing target read by pixel sensors in a line bounded by a black frame 404 forms a position four pixels below the position of the image sensing target read by the pixel sensors bounded by the black frame 402 in the vertical direction.

In this way, when the CCD area image sensor is used in a digital camera, since image data is sensed as a two-dimensional region, all the pixel sensors which configure the CCD area image sensor sense different positions of the image sensing target.

(2) In Case of General Image Processing Apparatus

By contrast, in case of a general image processing apparatus, the installation method and image sensing processing method of a CCD area image sensor are as follows.

i) Installation Method

In case of the image processing apparatus, the CCD area image sensor is installed at an installation position serving as a reference for a reading optical unit.

In the general image processing apparatus, when reflected light of light which comes from a light source and hits a document is captured by each pixel sensor, this reflected light is captured to have no tilt with respect to that pixel sensor. That is, each pixel sensor is installed to be able to capture reflected light with nearly no tilt.

More specifically, the main scanning direction of the CCD area image sensor is installed to be nearly horizontal to the installation plane of the pixel sensors, and the sub scanning direction is installed to be nearly perpendicular to the installation plane. At this time, any tilt is corrected albeit slight, and image sensing processing is executed under the assumption of no tilt.

ii) Image Sensing Processing Method

The image sensing processing method of the CCD area image sensor in the image processing apparatus will be described below.

The image processing apparatus reads a document placed on a document table while moving a reading optical unit including the CCD area image sensor in the sub scanning direction.

That is, the image processing apparatus executes image sensing processing by handling the pixel sensors included in the line bounded by, e.g., the black frame 402 as a line sensor (such line sensor will be referred to as a reading line sensor hereinafter, and obtained data will be referred to as line data hereinafter).

What kind of image data are generated by the image processing apparatus upon reading a document by the reading line sensors 402 and 403 will be described below using practical examples. Note that FIG. 5 shows image data of a document to be read in the following description. Each grid in FIG. 5 indicates the resolution of each pixel sensor which forms the reading line sensor 402 and the like.

When the reading optical unit moves below the document table in the sub scanning direction, the reading line sensors 402 and 403 sequentially read an image of a document.

That is, a part, which corresponds to the line width of each reading line sensor corresponding to the position of the reading optical unit, of the document shown in FIG. 5 is sequentially read.

The reading operation at this time will be described below with reference to FIGS. 6 to 10. When the reading optical unit moves below the document table in the sub scanning direction, hatched parts shown in 6a in FIG. 6, 7a in FIG. 7, 8a in FIG. 8, and 9a in FIG. 9 of the document are irradiated with light from a light source.

Figure 6:
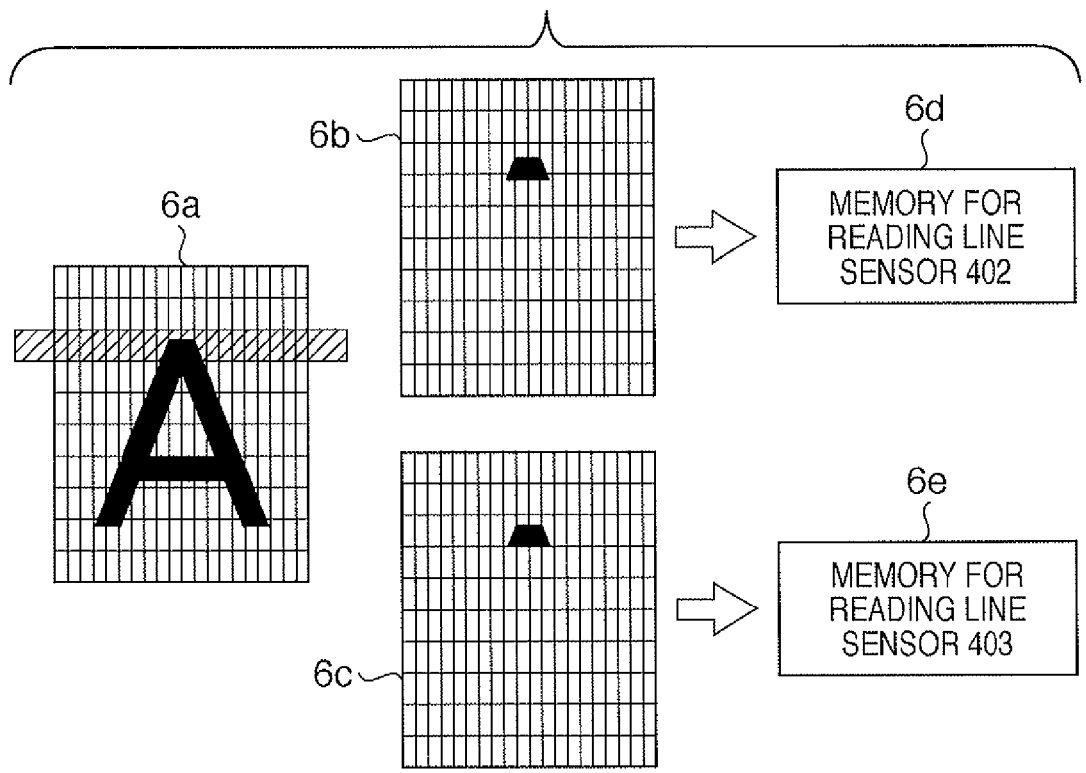
FIG. 6 shows image data generated when an image is read by reading line sensors in a general image processing apparatus.

Now assuming that the hatched part of the document shown in 6a in FIG. 6 is irradiated with light from the light source, the CCD area image sensor detects reflected light from the document, and generates line data for the line width of the part (hatched part) irradiated with the light.

More specifically, the reading line sensor 402 generates image data shown in 6b in FIG. 6. At the same time, the reading line sensor 403 generates image data shown in 6c in FIG. 6.

The reason why the reading positions between the two image data have a displacement is that the two reading line sensors 402 and 403 are installed to have a physical distance between them in the sub scanning direction.

As shown in 6d and 6e in FIG. 6, the image data generated by reading the document by the respective reading line sensors are stored in different storage media (RAMs or the like) for respective reading line sensors.

Figure 7:
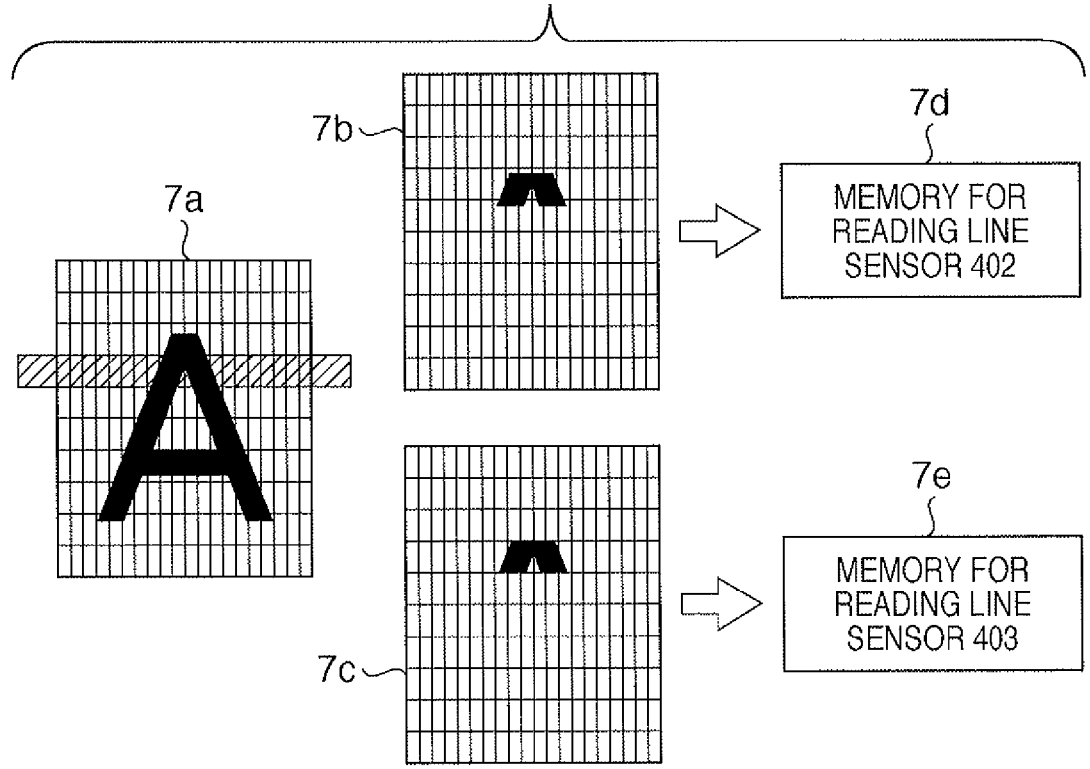
FIG. 7 shows image data generated when an image is read by the reading line sensors in the general image processing apparatus.

Next, when the reading optical unit moves, the light source moves, and the positions on the document to be read by the reading line sensors change, as shown in 7a in FIG. 7, the reading line sensor 402 generates image data shown in 7b in FIG. 7. Also, the reading line sensor 403 generates image data shown in 7c in FIG. 7.

Then, the image data generated by the reading line sensors 402 and 403 are respectively stored in the different storage media (e.g., RAMs), as shown in 7d and 7e in FIG. 7.

Figure 8:
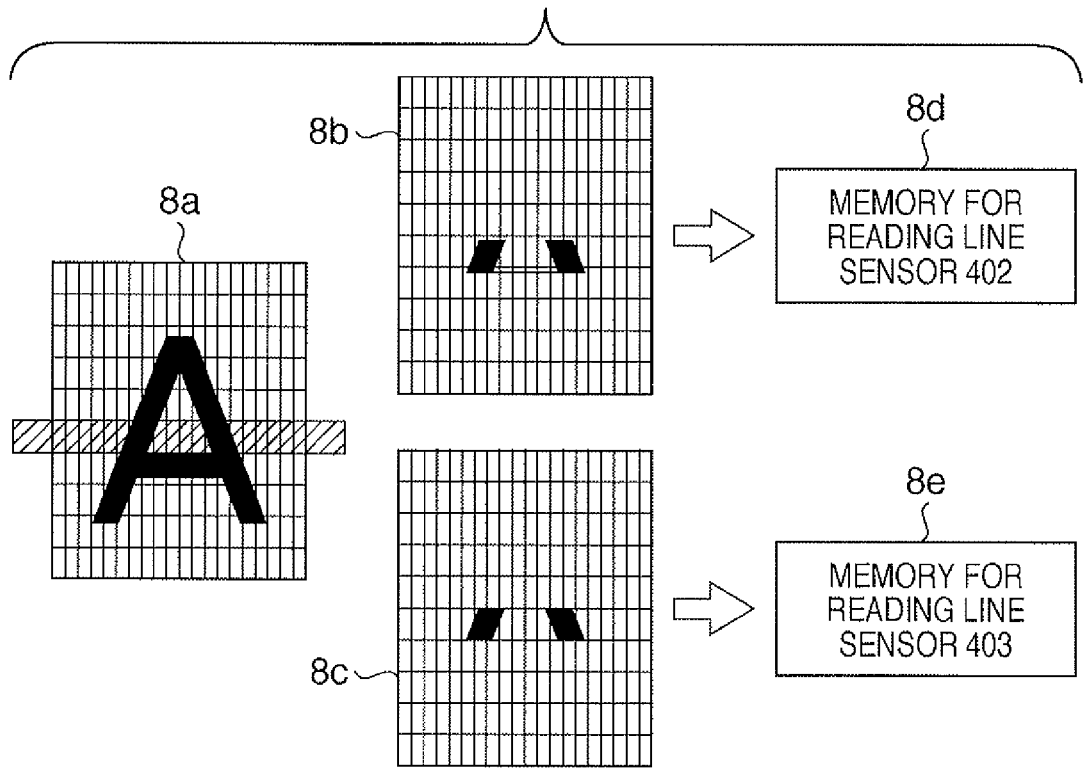
FIG. 8 shows image data generated when an image is read by the reading line sensors in the general image processing apparatus.

Likewise, when the document is read at the position indicated by the hatched part shown in 8a in FIG. 8, image data are generated, as shown in 8b and 8c in FIG. 8. Then, the image data generated by the reading line sensors 402 and 403 are stored in the different storage media (e.g., RAMs) for respective reading line sensors, as shown in 8d and 8e in FIG. 8.

Figure 9:
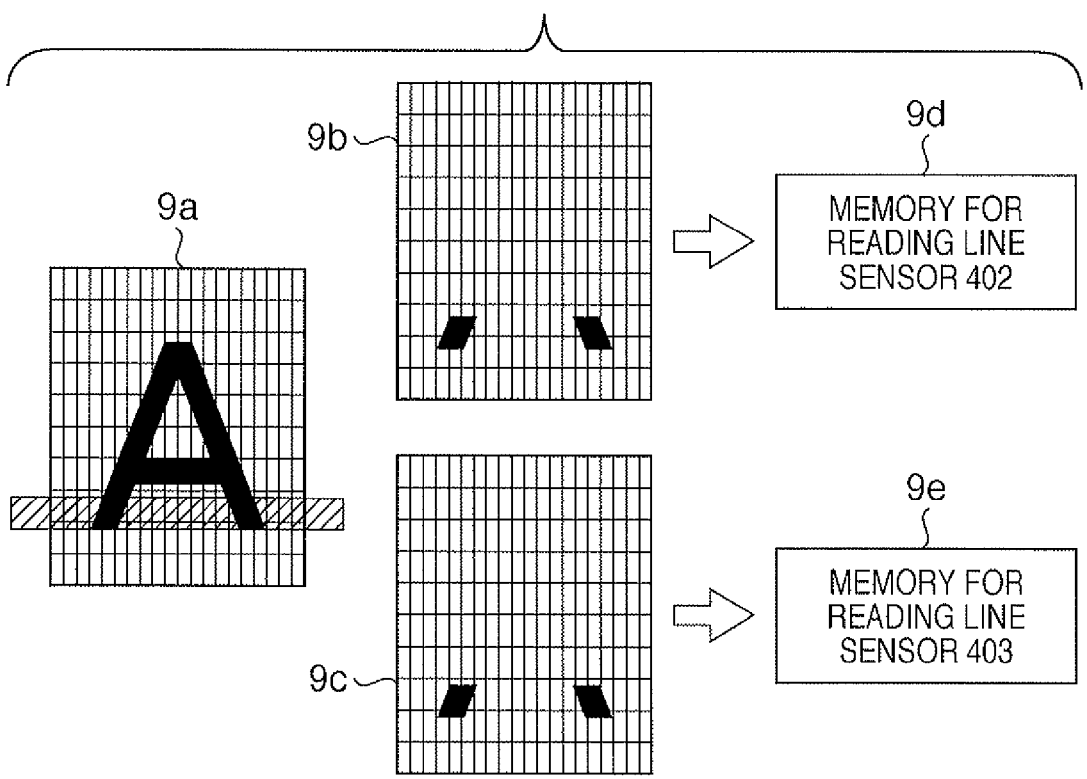
FIG. 9 shows image data generated when an image is read by the reading line sensors in the general image processing apparatus.

Furthermore, when the document is read at the position indicated by the hatched part shown in 9a in FIG. 9, image data are generated, as shown in 9b and 9c in FIG. 9. Then, the image data generated by the reading line sensors 402 and 403 are stored in the different storage media (e.g., RAMs) for respective reading line sensors, as shown in 9d and 9e in FIG. 9.

Finally, the full surface of the document is irradiated with light from the light source, and the reading line sensors 402 and 403 read the image of the document at the respective positions.

Figure 10:
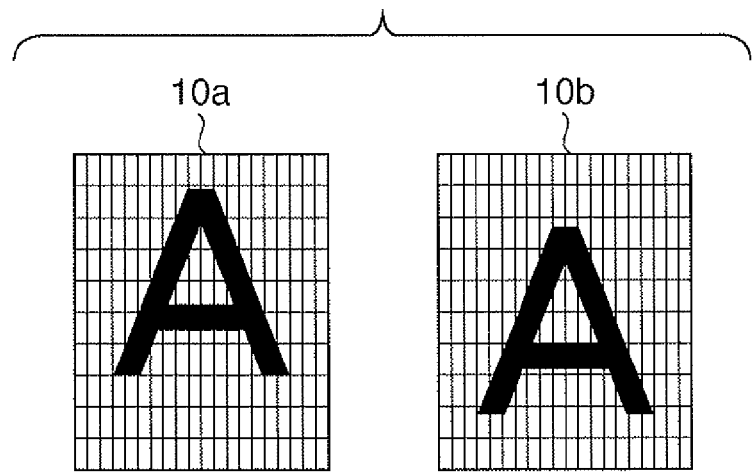
FIG. 10 shows image data generated upon completion of reading by the reading line sensors in the general image processing apparatus.

Since the image data generated in this way are sequentially stored in the storage media, two image data which have a displacement for one pixel in the sub scanning direction are finally generated, as shown in 10a and 10b in FIG. 10.

When all the reading line sensors operate similarly, image data having displacements in the sub scanning direction are generated in correspondence with the number of lines of the reading line sensors included in the CCD area image sensor.

That is, when this image sensing processing is executed, a plurality of image data (as many as the number of lines of the reading line sensors) which have continuous phase shifts in the sub scanning direction can be generated in a single reading operation.

4.3 Installation Method of CCD Area Image Sensor in Image Processing Apparatus 100 of This Embodiment By contrast, upon execution of super-resolution processing, a plurality of image data having document reading position displacements in the main scanning direction and sub scanning direction have to be generated, as described above. Furthermore, the reading position displacement at that time has to be less than one pixel (sub-pixel).

For this purpose, in case of the image processing apparatus 100 according to this embodiment, the CCD area image sensor is installed by the following installation method.

Figure 11:
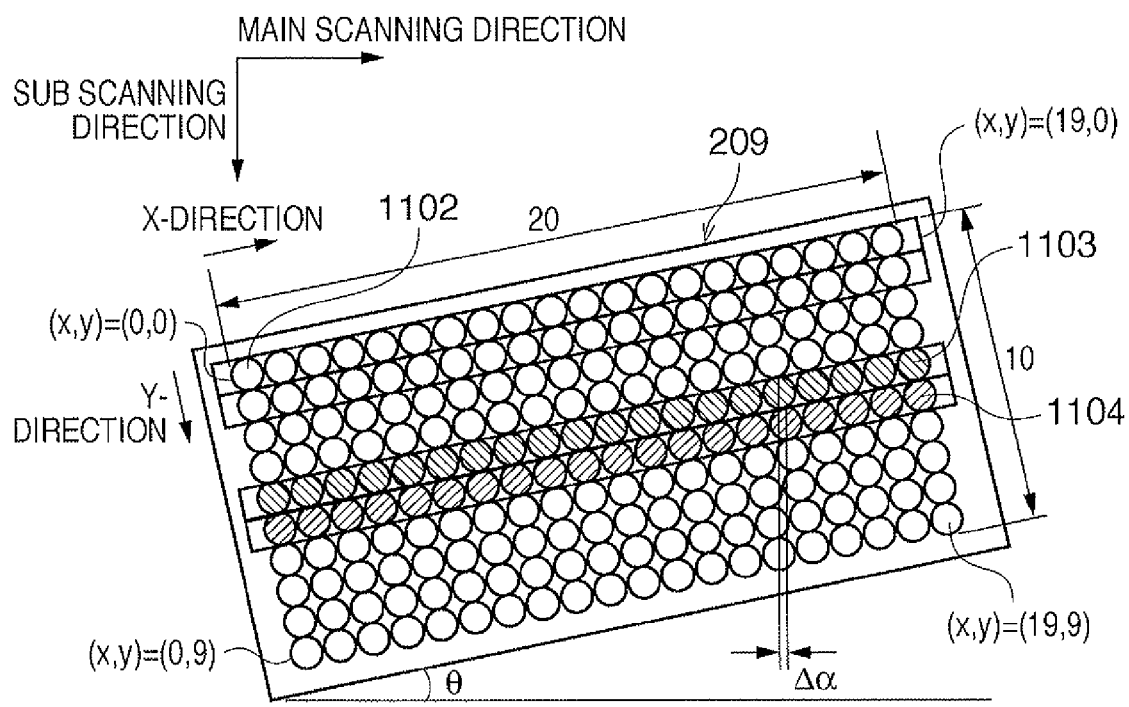
FIG. 11 is a view for explaining a method of installing a CCD area image sensor in the image processing apparatus 100.

FIG. 11 is a view for explaining the installation method of the CCD area image sensor 209 in the image processing apparatus 100 according to this embodiment. In FIG. 11, reference numeral 209 denotes a CCD area image sensor.

As shown in FIG. 11, the image processing apparatus 100 according to this embodiment is wherein the CCD area image sensor 209 is installed to have a tilt from the reference installation position in the main scanning direction and sub scanning direction.

That is, a lowermost reading line sensor laid out in the CCD area image sensor 209 makes a skew angle θ with the main scanning direction of the CCD area image sensor (FIG. 4) when it is installed at the reference installation position.

Note that the position of each pixel sensor which forms the CCD area image sensor 209 in this case can be expressed to have the uppermost left end pixel of the CCD area image sensor 209 as an origin, the main scanning direction as an x-direction, and the sub scanning direction as a y-direction.

That is, assume that the coordinates of the uppermost left end pixel are expressed by (x, y)=(0, 0), and those of the uppermost right end pixel are expressed by (x, y)=(19, 0). Likewise, assume that the coordinates of the lowermost left end pixel are expressed by (x, y)=(0, 9), and those of the lowermost right end pixel are expressed by (x, y)=(19, 9).

Reference numeral 1103 denotes a reading line sensor for one line, which forms the CCD area image sensor 209. The reading line sensor 1103 includes 20 pixel sensors laid out in the main scanning direction.

That is, the reading line sensor 1103 includes pixel sensors whose coordinate positions are respectively (0, 4), (1, 4), (2, 4), . . . , (19, 4).

Likewise, a reading line sensor 1104 includes pixel sensors whose coordinate positions are respectively (0, 5), (1, 5), (2, 5), . . . , (19, 5).

4.4 Image Sensing Processing Method by CCD Area Image Sensor in Image Processing Apparatus 100 of This Embodiment The image sensing processing method in case of the image processing apparatus 100 according to this embodiment in which the CCD area image sensor 209 is installed by the aforementioned installation method will be described below. In the following description, in order to clarify differences from the image sensing processing method in the general image processing apparatus, image data of a document shown in FIG. 5 is used.

What kind of image data are generated upon reading a document by the reading line sensors 1103 and 1104 will be described below using practical examples.

Note that the reading operation by the reading line sensors 1103 and 1104 is the same as that by the reading line sensors 402 and 403. However, since the reading line sensor has the skew angle θ with respect to the reference installation position, it generates image data having a tilt of the skew angle θ.

Figure 12:
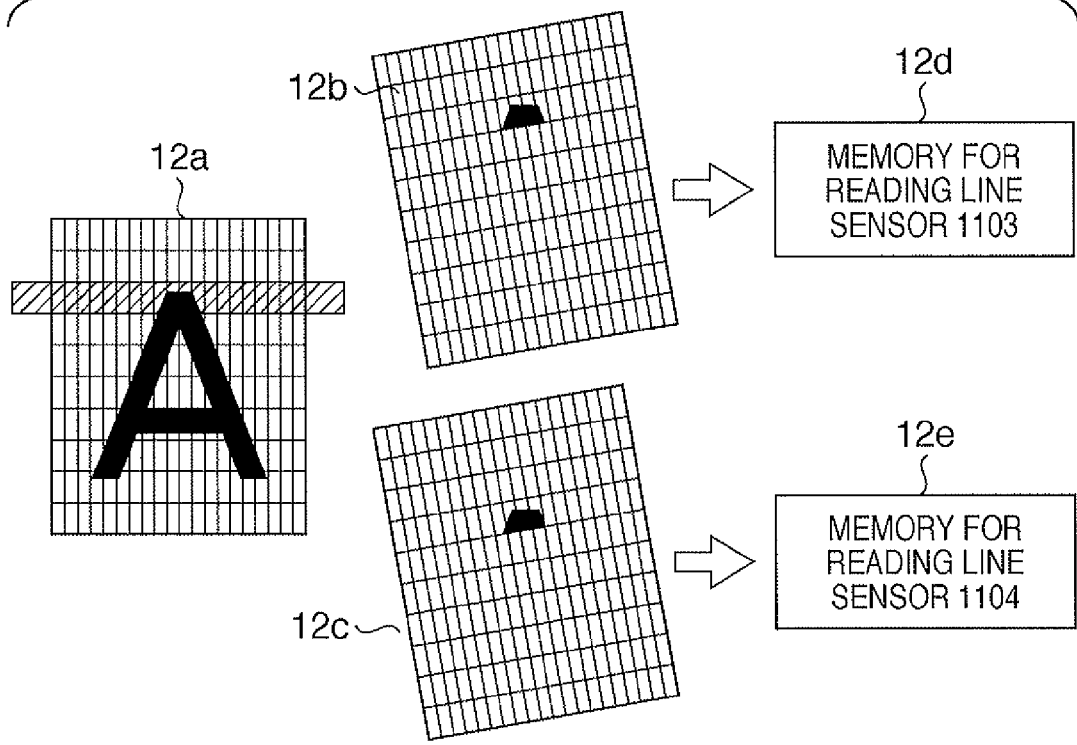
FIG. 12 shows image data generated when an image is read by reading line sensors in the image processing apparatus 100.

For example, the reading line sensors 1103 and 1104 generate image data, as shown in 12b and 12c in FIG. 12. As shown in 12d and 12e in FIG. 12, these image data are respectively stored in different storage media (e.g., RAMs) to have the tilt.

Figure 13:
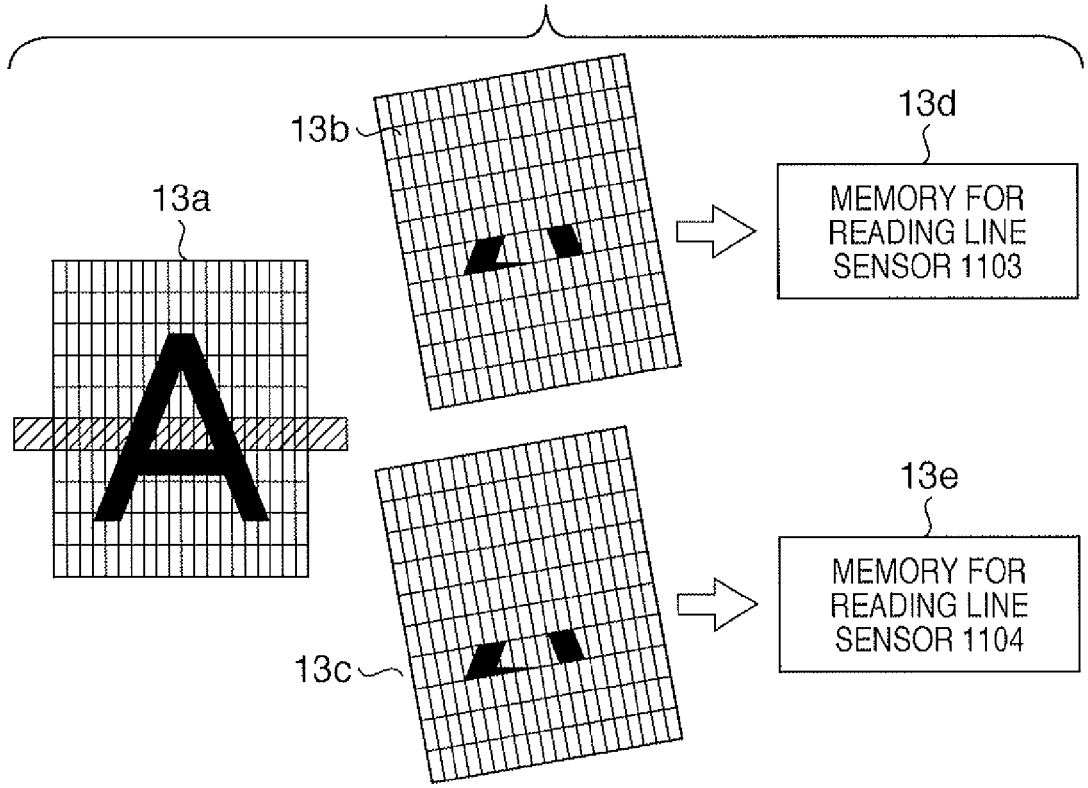
FIG. 13 shows image data generated when an image is read by the reading line sensors in the image processing apparatus 100.

Likewise, when the reading optical unit 203 moves, the light source moves, and the positions of the document to be read by the reading line sensors 1103 and 1104 change, as shown in 13a in FIG. 13, image data are generated, as shown in 13b and 13c in FIG. 13.

As shown in 13d and 13e in FIG. 13, the image data generated by the reading line sensors 1103 and 1104 are respectively stored in different storage media (e.g., RAMs).

Figure 14:
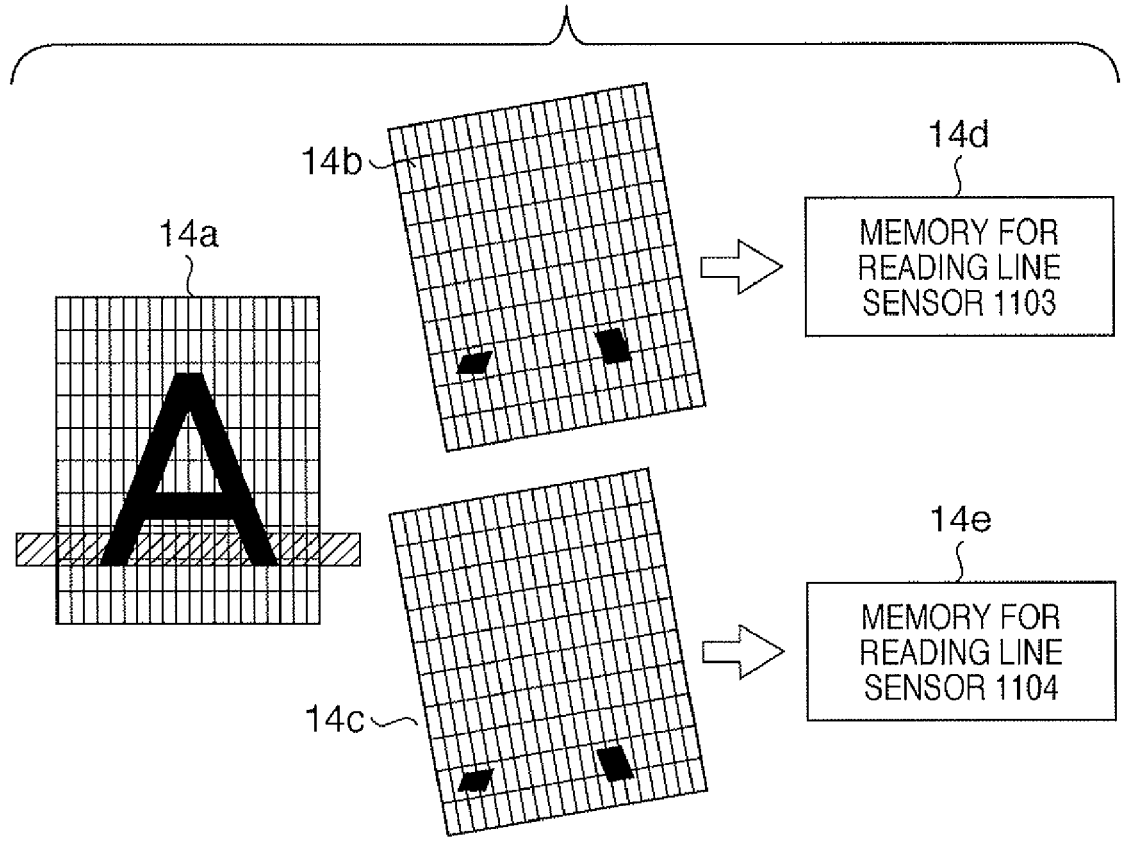
FIG. 14 shows image data generated when an image is read by the reading line sensors in the image processing apparatus 100.

Furthermore, when the reading optical unit 203 moves, the light source moves, and the positions of the document to be read by the reading line sensors 1103 and 1104 change, as shown in 14a in FIG. 14, image data are generated, as shown in 14b and 14c in FIG. 14.

As shown in 14d and 14e in FIG. 14, the image data generated by the reading line sensors 1103 and 1104 are respectively stored in different storage media (e.g., RAMs).

Figure 15:
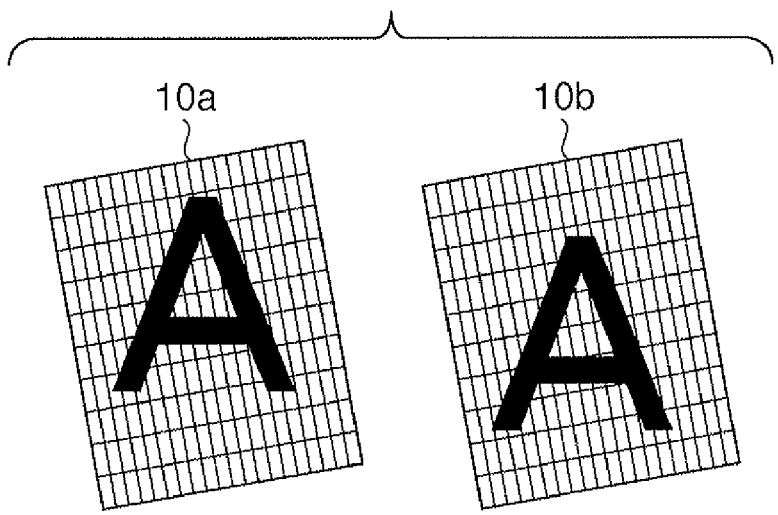
FIG. 15 shows image data generated upon completion of reading by the reading line sensors in the image processing apparatus 100.

The document is read by the reading line sensors 1103 and 1104 to finally generate image data, as shown in 15a and 15b in FIG. 15 (both the image data have a tilt of the skew angle θ).

As has been described above using FIG. 11, the reading line sensors 1103 and 1104 physically have a displacement for one pixel sensor in the sub scanning direction. Therefore, the pixel sensors which form the reading line sensor 1103 have a phase shift in the horizontal direction from those which form the reading line sensor 1104.

For example, a pixel sensor located at the coordinates (x, y)=(15, 4) of the reading line sensor 1103 and that located at the coordinates (x, y)=(15, 5) of the reading line sensor 1104 have a displacement for y=one pixel sensor as the positions in the y-axis direction. This displacement brings about a phase shift of Δβ in the sub scanning direction.

On the other hand, the positions in the x-axis direction are the same, i.e., x=15. However, due to the skew angle θ, when viewed in the horizontal direction as the main scanning direction before the whole CCD area image sensor 209 is tilted, the phase shifts by a small amount Δα within a sub-pixel.

That is, even the pixel sensors at the same position in the x-axis direction in the reading line sensors have a small phase shift, which depends on the skew angle with respect to the horizontal direction as the main scanning direction since the CCD area image sensor 209 is installed to have a tilt.

Therefore, image data generated by the reading line sensors defined in the CCD area image sensor 209 have different phase shifts for respective reading line sensors.

For example, the read image data shown in 15a in FIG. 15 and that shown in 15b in FIG. 15 have not only a phase shift of Δβ in the sub scanning direction but also that of Δα in the main scanning direction.

Note that the two reading line sensors (reading line sensors 1103 and 1104) have been described. However, the same applies to other reading line sensors which form the CCD area image sensor.

As described above, by installing the CCD area image sensor to have a tilt, image data having phase shifts less than one pixel in the sub scanning direction and main scanning direction can be generated in correspondence with the number of lines of the reading line sensors.

5. Description of Resolution Conversion Function in Controller 216

The resolution conversion function in the controller 216 will be described below. The resolution conversion function in the controller 216 is wherein image data having a target resolution is generated by combining super-resolution processing and variable-magnification processing.

Hence, details of the super-resolution processing will be explained first, and the resolution conversion function in the controller 216 of this embodiment will be explained.

5.1 Details of Super-Resolution Processing

Figure 16:
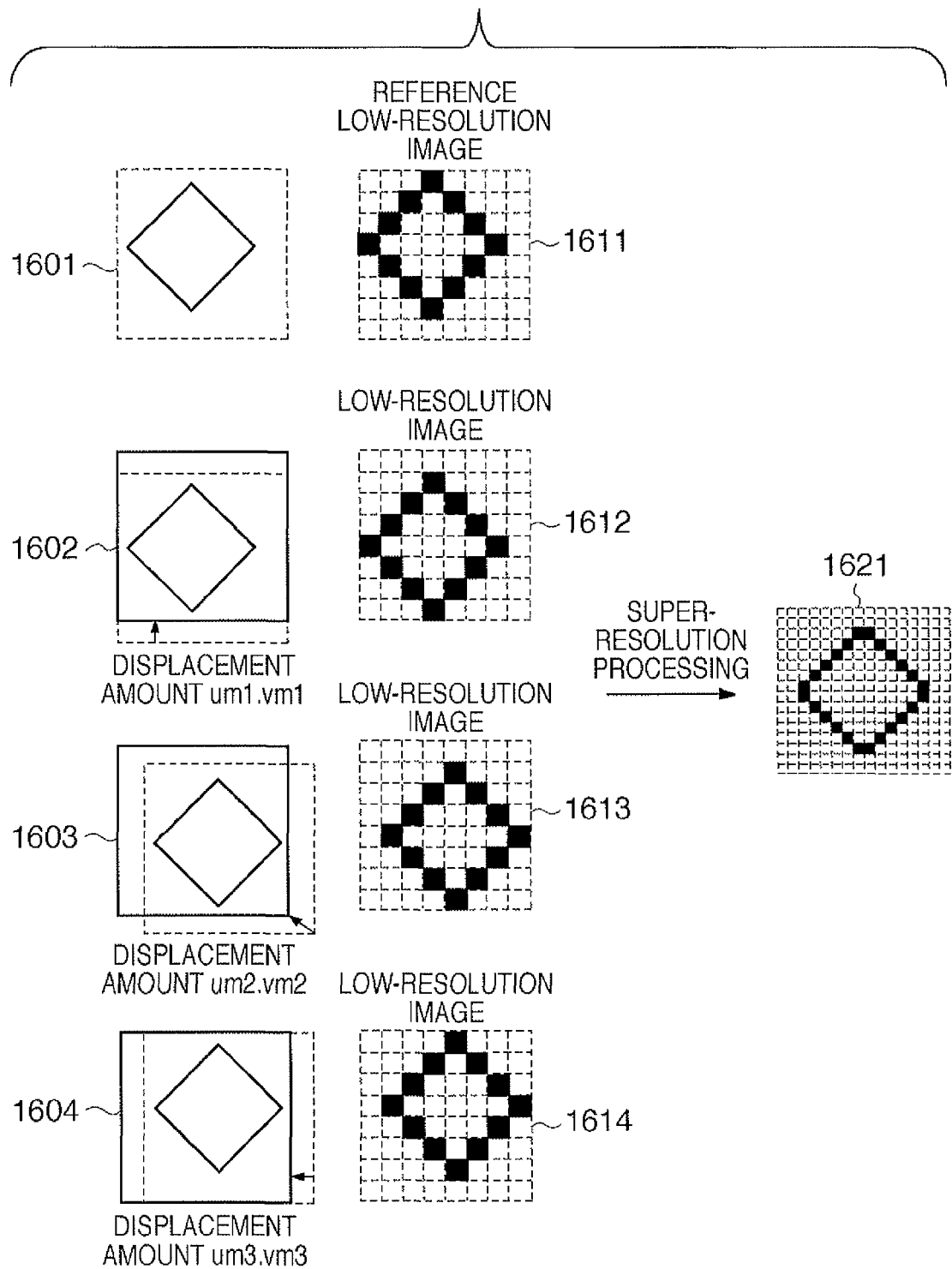
FIG. 16 is a view for explaining the execution sequence of super-resolution processing based on four low-resolution image data acquired by the scanner unit 110.

Details of the super-resolution processing will be explained first using a practical example. Note that the super-resolution processing method is not limited to a practical example to be described below. In this embodiment, a method of obtaining a single high-resolution image from a plurality of original images is defined as the super-resolution processing. FIG. 16 is a view for explaining the execution sequence of the super-resolution processing based on four low-resolution image data acquired by the scanner unit 110.

Since each low-resolution image data acquired by the scanner unit 110 has a tilt, the tilt is corrected. In this case, the skew angle θ of each acquired low-resolution image data is a value acquired upon mounting the CCD area image sensor 209 in the reading optical unit 203 in the assembly process of the image processing apparatus 100 including the CCD area image sensor 209. Assume that the skew angle θ is held in a storage medium in the image processing apparatus 100 as a value unique to the mounted apparatus.

In the image processing apparatus 100, by executing affine transformation using the skew angle information, each generated low-resolution image data is rotated to compensate the image data to reduce the tilt with respect to the main scanning direction, thus correcting the tilt of the image data.

Let (X, Y) be the coordinates before affine transformation, (X', Y') be the coordinates after affine transformation, and θ be the rotation angle (the skew angle of the CCD area image sensor 209). Then, image data in which the tilt is corrected by affine transformation processing can be obtained. The affine transformation processing is given by:

$$[X', Y', 1] = [X, Y, 1] \begin{bmatrix} \cos\theta & \sin\theta & 0 \\ -\sin\theta & \cos\theta & 0 \\ 0 & 0 & 1 \end{bmatrix} \quad (1)$$

where X', Y': the coordinate position after transformation, and
X, Y: the coordinate position before transformation.

Image data obtained by the affine transformation processing is low-resolution image data in which the tilt is corrected. Note that the method of correcting the tilt is not limited to affine transformation, and other methods may be used.

After the tilts of the plurality of image data are corrected, the super-resolution processing is then applied.

In FIG. 16, reference numerals 1601 to 1604 denote documents. Reference numeral 1611 denotes image data obtained by reading the document by the CCD area image sensor 209, i.e., reference low-resolution image data in which the tilt is corrected. Furthermore, reference numerals 1612 to 1614 denote target low-resolution image data.

Reference numeral 1621 denotes super-resolution image data obtained by applying the super-resolution processing using the reference low-resolution image data 1611 and target low-resolution image data 1612 to 1614.

Furthermore, dotted line rectangles which respectively bound the documents 1601 to 1604 indicate reading regions upon reading the reference low-resolution image data 1611 by the CCD area image sensor 209. Solid line rectangles indicate reading regions upon respectively reading the target low-resolution image data 1612 to 1614 by the CCD area image sensor 209.

The plurality of low-resolution image data used in the super-resolution processing have phase shifts less than one pixel in the main scanning direction and sub scanning direction. Using these small phase shifts, the super-resolution processing can be implemented.

Therefore, pixels (to be referred to as "super-resolution pixels" hereinafter) which form the generated super-resolution image data include those which are not included in the reference low-resolution image data and target low-resolution image data.

Figure 17:
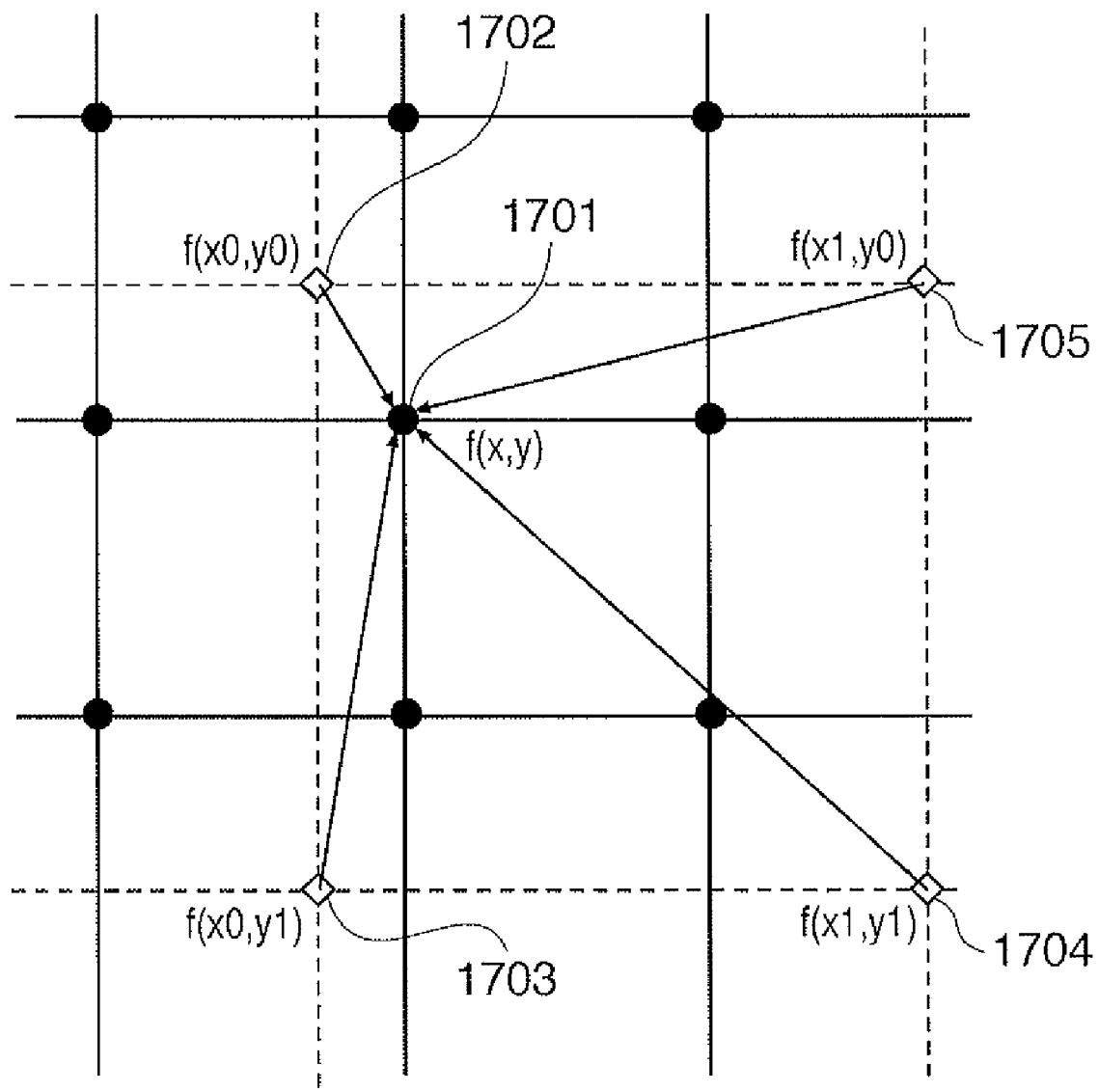
FIG. 17 is a view showing details of the super-resolution processing.

While these pixels are composited by executing predetermined interpolation processing using pixel data indicating pixel values of pixels located around these super-resolution pixels, the super-resolution processing is executed. As the interpolation processing, a bilinear method, bicubic method, nearest neighbor method, and the like can be used. The interpolation processing based on the bilinear method will be described below with reference to FIG. 17.

When the interpolation processing based on the bilinear method is used, a nearest neighbor pixel 1702, which has a shortest distance from the position of a super-resolution pixel 1701 is extracted from the reference low-resolution image data and target low-resolution image data. Then, four pixels which surround the super-resolution pixel position of the target low-resolution image data are determined as surrounding pixels 1702 to 1705, values obtained by adding predetermined weights to data values of the surrounding pixels are averaged, and the data value of the super-resolution pixel is calculated by:

$$f(x,y)=[|x1-x|\{|y1-y|f(x0,y0)+|y-y0|f(x0,y1)\}+|x-x0|\{|y1-y|f(x,y0)+|y-y0|f(x1,y1)\}]/|x1-x0||y1-y0|$$

By repeating the aforementioned processing for respective super-resolution pixels, the super-resolution image data 1621 having a 2× resolution can be obtained from the low-resolution image data shown in FIG. 16. Note that the resolution is not limited to 2×, and various other magnifications can be used. As the number of the data values of the low-resolution image data used in the interpolation processing becomes larger, a higher-resolution super-resolution image can be obtained.

5.2 Description of Resolution Conversion Function in This Embodiment

Figure 18:
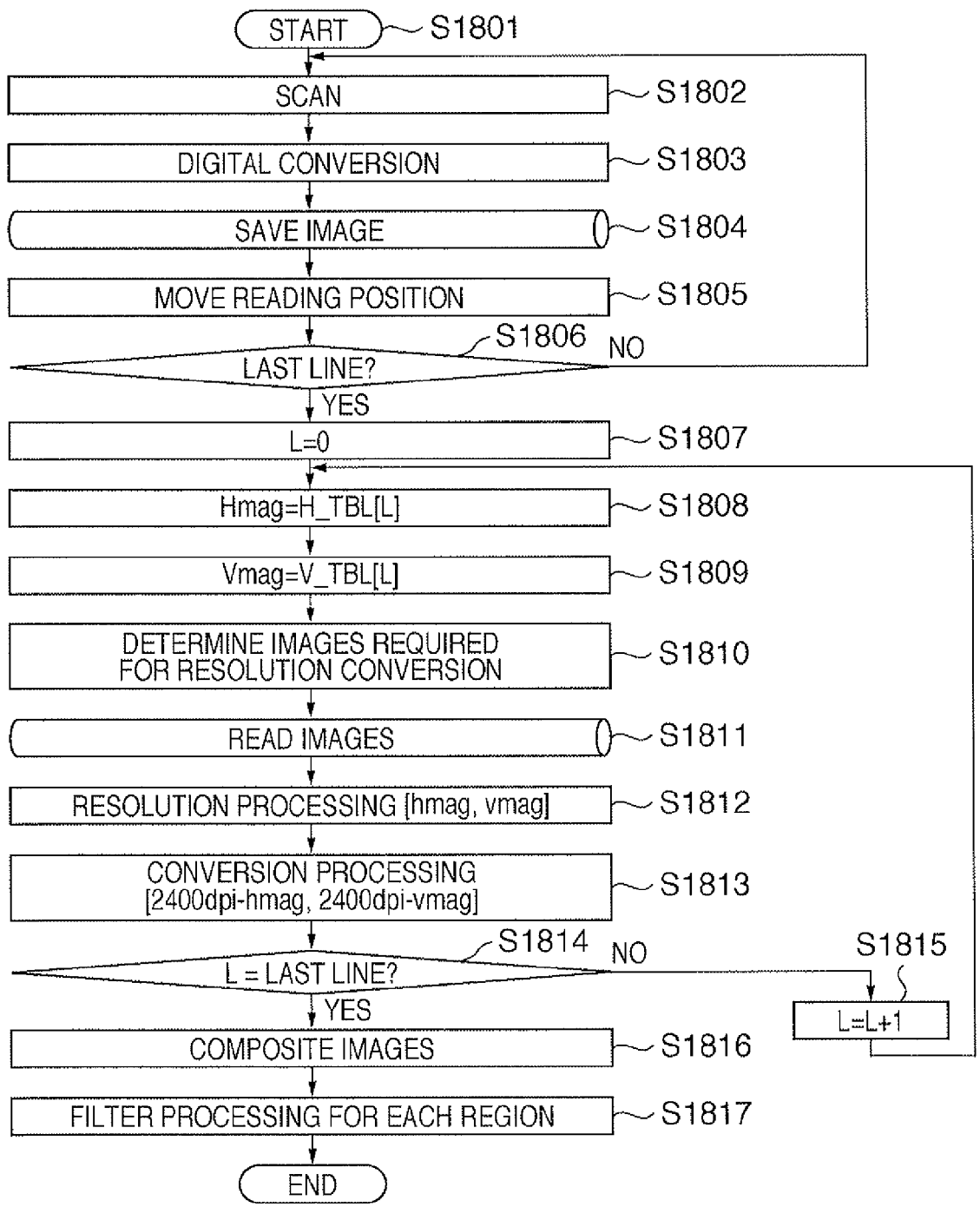
FIG. 18 is a flowchart showing the sequence of the super-resolution processing in the image processing apparatus 100.

The sequence of the resolution conversion processing in the image processing apparatus 100 according to this embodiment will be described below with reference to the flowchart of FIG. 18. Note that the resolution conversion processing executed according to the flowchart shown in FIG. 18 is implemented when the data processor 301 reads out and executes a program stored in the ROM 307.

Upon reception of a document read instruction and a target resolution selection instruction from the user interface 300 or LAN controller 305, the program starts processing in step S1801.

Note that the following description will be given to have the target resolution=2400 dpi. However, the target resolution that can be selected by the image processing apparatus 100 according to this embodiment is not limited to 2400 dpi. Also, the following description will be given to have 100 dpi in the main scanning direction×100 dpi in the sub scanning direction as the resolution of the CCD area image sensor 209 used in this embodiment. However, CCD area image sensors having other resolutions may be used.

In step S1802, the reading operation is executed. More specifically, the CCD area image sensor 209 senses an image of a document. If the frame size is 290 mm×200 mm, since the resolution of the CCD area image sensor 209 is 100 dpi, the number of pixels of image data acquired at that time is about 1140 pixels×780 pixels.

In the scanner unit 110, light emitted by the illumination device 204 is reflected by a document on the document table 202, and is further reflected by the mirrors 205 to 207. The light is focused by the lens 208, and is then received by the CCD area image sensor 209.

Note that the CCD area image sensor 209 converts the received optical signal into an analog voltage, and dot-sequentially outputs the analog voltage to the controller 216 via the cable 210.

In step S1803, the controller 216 converts the received analog voltage into digital data and generates image data of 1140 pixels×780 pixels. In step S1804, the controller 216 stores the generated image data in the RAM 306.

In step S1805, the reading position is moved. Assume that the moving distance at that time is predetermined (however, the moving distance may be changed based on the designated target resolution). In this embodiment, assume that the moving distance is set to be about 10 mm.

In order to execute the super-resolution processing, a plurality of image data with phase shifts have to be generated. Therefore, the moving distance at that time is desirably set to cause a phase shift in the sub scanning direction, and not to be an integer multiple of the resolution (100 dpi) of the CCD area image sensor 209 in the sub scanning direction.

The reading position is moved when the reading optical unit 203 moves as a result of outputting a control signal from the data processor 301 to the motor driving control circuit 215 and driving the stepping motor 212.

With this operation, the position of the document to be read by the CCD area image sensor 209 upon execution of the next reading operation moves 10 mm in the sub scanning direction.

It is checked in step S1806 if the reading position has reached the document terminal end (last line). If it is determined that the reading position has reached the document terminal end, the process advances to step S1807. On the other hand, if it is determined that the reading position has not reached the document terminal end yet, the process returns to step S1802 to continue the reading operation.

When it is determined in step S1806 that the reading position has reached the terminal end position, this means that the RAM 306 has stored image data having phase shifts less than one pixel in the sub scanning direction and main scanning direction in correspondence with the number of lines of the reading line sensors. In this embodiment, 21 image data of 100 dpi are stored.

Since these 21 image data have reading position displacements by 10 mm in the sub scanning direction, coarse and dense parts of image data are generated. Then, the dense part (central part in the sub scanning direction) of image data can be converted into super-resolution image data of 2400 dpi by the super-resolution processing.

On the other hand, the data amounts of upstream and downstream parts of image data are not enough to be converted into 2400-dpi data. Thus, the controller 216 executes the following processing. Note that the 21 image data stored in step S1804 are expressed by img[m] (m=0 to 20) in the following description.

In step S1807, an initial value "0" is set in a variable L (L=0). The variable L indicates the position on the document in the sub scanning direction where the super-resolution processing is executed. In case of this embodiment, the reading optical unit 203 moves for 220 mm in increments of 10 mm. Hence, there are sub scanning positions 0 to 20.

In step S1808, the value of the main scanning LUT table (H_TBL[L]) 303 according to the value of L is read, and is stored in a variable hmag. 19a in FIG. 19 shows a practical example of the H_TBL 303. As shown in 19a in FIG. 19, upon reception of a sub scanning position (L), the H_TBL 303 outputs a resolution feasible in the main scanning direction.

In step S1809, the value of the sub scanning LUT table (V_TBL[L]) 304 according to the value of L is read, and is stored in a variable vmag. 19b in FIG. 19 shows a practical example of the V_TBL 304. As shown in 19b in FIG. 19, upon reception of a sub scanning position (L), the V_TBL 304 outputs a resolution feasible in the sub scanning direction.

In step S1810, image data to be used in the super-resolution processing are determined. As described above, at the end part of the document, only one image data can be selected. However, for the central part, a maximum of 20 image data can be selected.

Image data for the number of images required to execute resolution conversion to 2400 dpi as the target resolution are selected for each sub scanning position L. That is, by selecting image data for the number of images corresponding to the sub scanning position L, the target resolution can be realized at the sub scanning position L.

For example, letting img[m] be image data, if L=0, m=0 (the number of image data is one). However, if L=11, since image data m=1 to 20 can be used, N=20. In case of 19a and 19b in FIG. 19, the super-resolution processing for converting from 100 dpi into 2400 dpi in both the main scanning direction and sub scanning direction can be executed.

In step S1811, actually designated N image data img[m] are read. In step S1812, the super-resolution processing is executed for the read image data. At this time, one super-resolution image data is generated by executing the super-resolution processing at the resolutions hmag and vmag.

In step S1813, as resolution conversion processing to be executed when the resolution of the super-resolution image data generated in step S1812 does not reach 2400 dpi as the target resolution of the super-resolution processing, variable-magnification processing is executed in both the main scanning direction and sub scanning direction. As this variable-magnification processing, a generally used method, for example, a bicubic method is used.

However, the variable-magnification processing is not limited to such specific methods, and the resolution is converted into 2400 dpi using suited variable-magnification processing. Note that a variable magnification ratio used in step S1813 can be calculated by (2400 dpi−hmag)÷hmag in the main scanning direction, and by (2400 dpi−vmag)÷vmag in the sub scanning direction.

20a and 20b in FIG. 20 show the ratio between the super-resolution processing and variable-magnification processing in the aforementioned resolution conversion processing. The ratio between the super-resolution processing and variable-magnification processing changes depending on the positions in the sub scanning direction where the resolution conversion processing is executed, thus realizing a resolution of 2400 dpi as the target resolution at all the sub scanning positions.

For example, since hmag=800 dpi and vmag=600 dpi at the sub scanning position L in FIG. 20, the respective variable magnification ratios are:

Main scanning variable magnification ratio=(2400 dpi−800 dpi)/800 dpi=200%

Sub scanning variable magnification ratio=(2400 dpi−600 dpi)/600 dpi=300%

It is checked in step S1814 if the resolution conversion processing is complete until the last line (L=20). If it is determined that the processing is not complete yet, L is incremented. If it is determined that the processing is complete, the process advances to step S1816.

In step S1816, the (21) image data at the positions L=0 to 20 that have undergone the resolution conversion processing are composited according to the positions of the image data in the sub scanning direction. As a result, super-resolution image data can be generated from a plurality of low-resolution image data.

In step S1817, region-dependent filtering processing is applied to the super-resolution image data generated in step S1816. This is to reduce steps generated upon switching between the super-resolution processing and variable-magnification processing for respective regions. For example, at the positions L=0 to 3 and L=16 to 20 as the document end parts where the ratio of the variable-magnification processing is high, since the resolution has already dropped due to the variable-magnification processing, a weak filter is selected.

On the other hand, at the positions L=8 to 12, since the super-resolution processing is effectively executed, the resolution does not drop. Hence, a strong filter is applied to lower the resolution to that near the positions L=0 to 3 and L=16 to 20, thereby reducing resolution differences.

However, since the filtering processing corresponds to adjustment items at the time of design, it is not limited to the contents described herein.

For example, when the position of each character in a document is detected, and that character is not included in a low-resolution region after the super-resolution processing, the resolution need not be adjusted by a large amount by the filtering processing. When the super-resolution image data is used in OCR (character recognition), since it preferably has a higher resolution, the resolution of a high-resolution region after the super-resolution processing need not be adjusted.

As can be seen from the above description, in this embodiment, upon generating image data used in the super-resolution processing, the CCD area image sensor is operated within the range of the document size. Then, as for the upstream and downstream parts of the document for which the target resolution cannot be realized by only the super-resolution processing, the variable-magnification processing is applied to realize the target resolution.

As a result, a desired resolution can be realized by a small footprint.

Second Embodiment

The first embodiment has explained the case in which the document size is maximum. However, the present invention is not limited to such specific embodiment.

This embodiment will explain a case in which the document size is not maximum (for example, an A4 document is read by an A3-compatible scanner unit). Note that this embodiment will mainly explain differences from the first embodiment.

Figure 21:
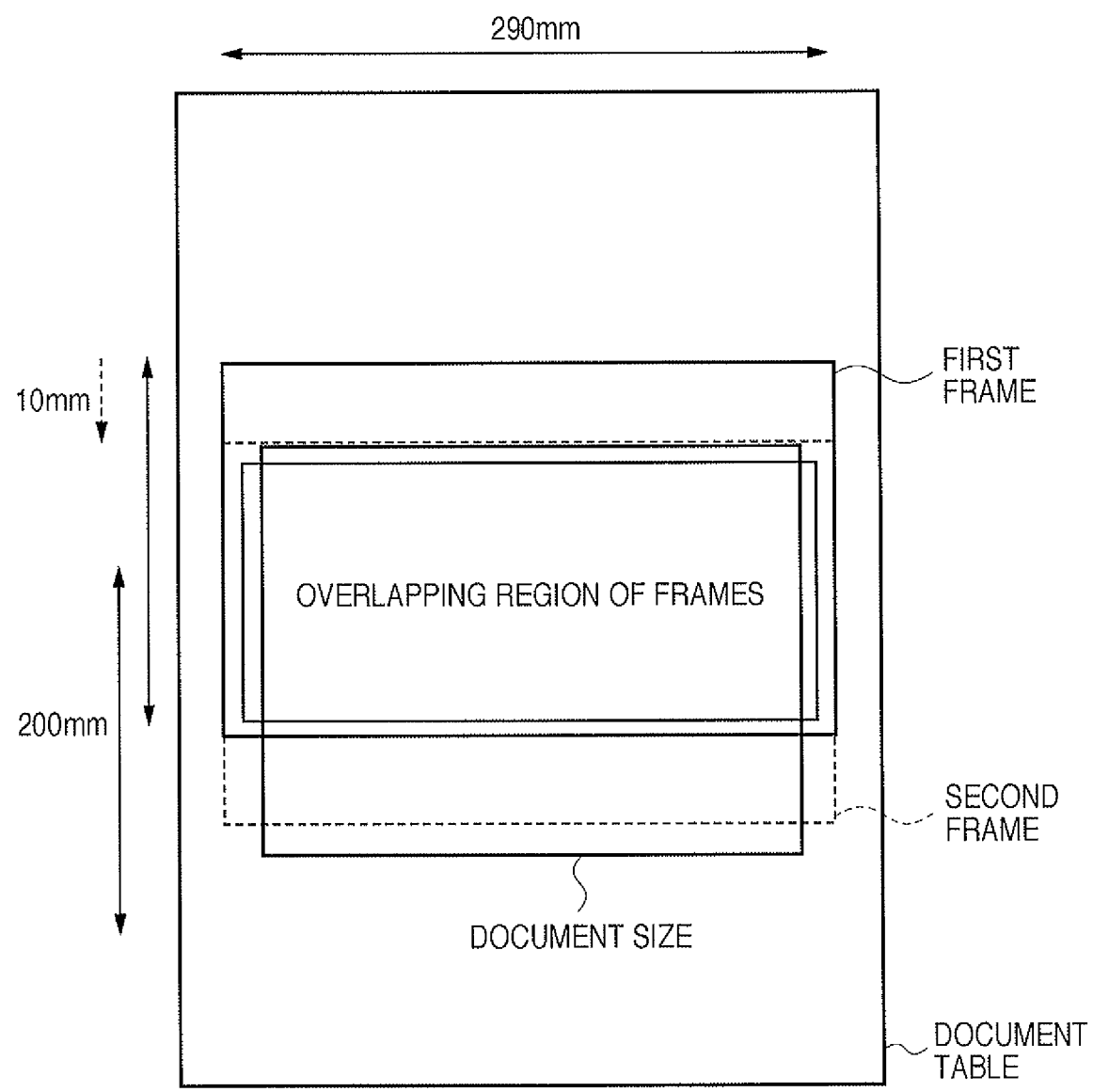
FIG. 21 is a view showing a reading position when a document size is not maximum with respect to a reading region.

When the document size is not maximum with respect to the operation range of the CCD area image sensor, the document placing position on the image processing apparatus 100 can be moved to a position on the downstream side in the sub scanning direction (see FIG. 21). As a result, the number of regions where frames overlap is increased compared to a case in which a document is placed at the end portion of the document table 202, and the number of positions in the sub scanning direction, which allow to realize the target resolution by only the super-resolution processing, is increased.

Figure 22:
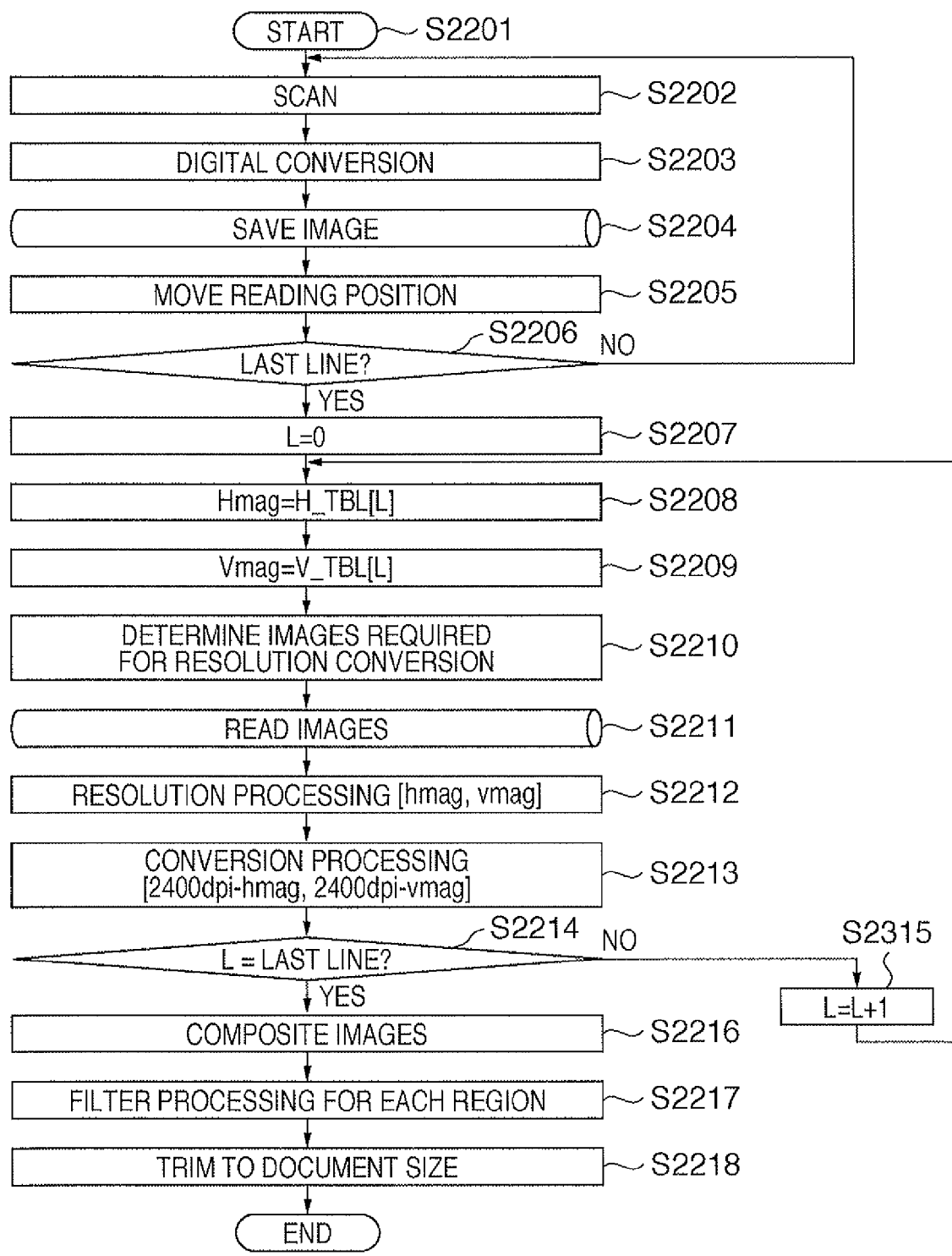
FIG. 22 is a flowchart showing the sequence of the super-resolution processing in the image processing apparatus 100.

For a document placed in this way, the second embodiment executes resolution conversion processing according to the flowchart of FIG. 22. Since steps S2201 to S2217 in the flowchart of FIG. 22 are the same processes as those in steps S1801 to S1817 in FIG. 18, a repetitive description thereof will be avoided.

In step S2218, the super-resolution image data which realizes the target resolution by the super-resolution processing and variable-magnification processing for an actual A4-size region is appropriately trimmed to an A4 size.

In this case, the generated super-resolution image data is the same as that in the first embodiment. However, by selecting actual reading regions from those which have higher ratios of the super-resolution processing, super-resolution image data can be obtained.

As can be seen from the above description, according to this embodiment, when the document size is smaller than the reading operation range of the CCD area image sensor, optimal resolution conversion processing can be assigned.

Third Embodiment

The third embodiment will explain a case in which resolution conversion processing is executed for each line in the sub scanning direction of the CCD area image sensor 209 as a unit.

The image sensing processing method of the CCD area image sensor according to this embodiment will be described below with reference to FIG. 23. In this case, the CCD area image sensor has one line in the main scanning direction as one image unit, and the number of pixel sensors in the sub scanning direction as a unit of images. That is, since there are 780 lines in the sub scanning direction, 780 image data are generated.

Figure 23:
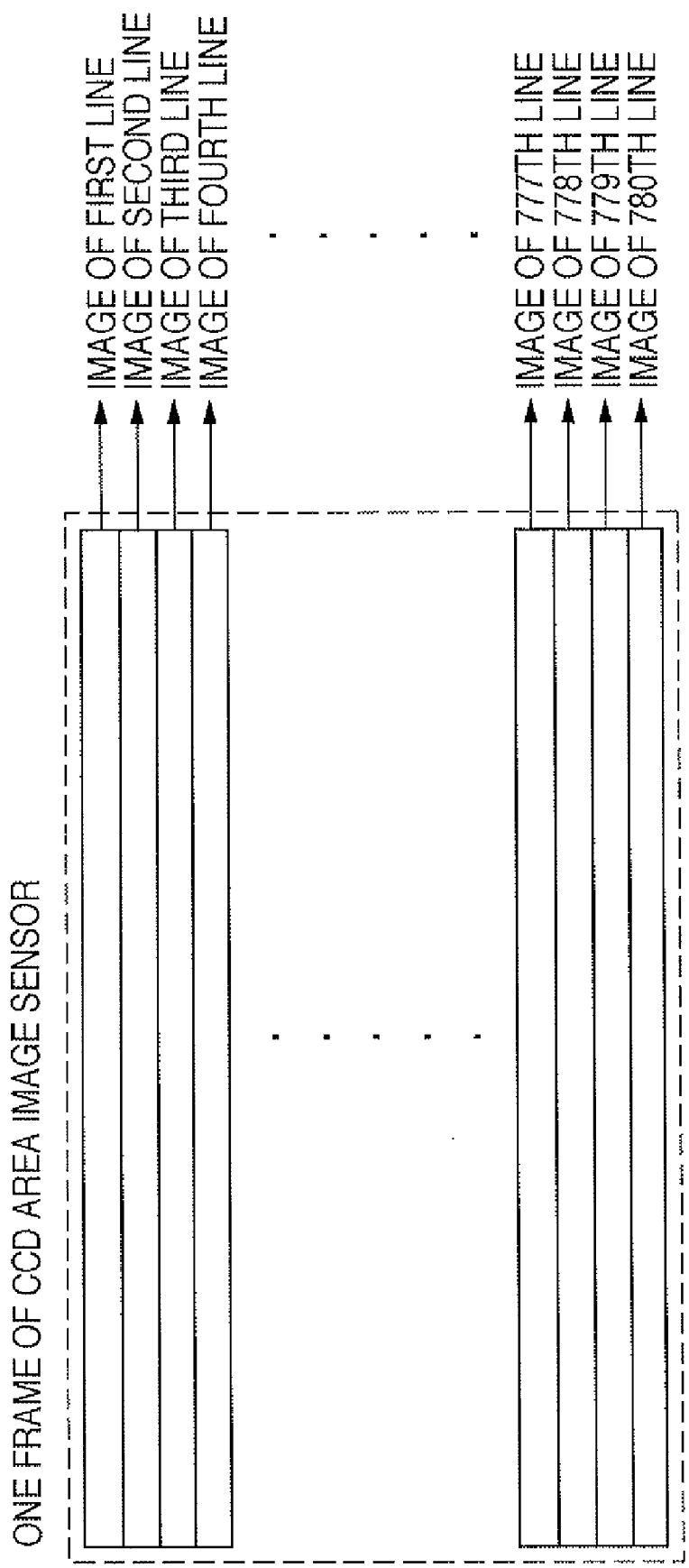
FIG. 23 is a view for explaining the image sensing processing method of the CCD area image sensor.
Figure 24:
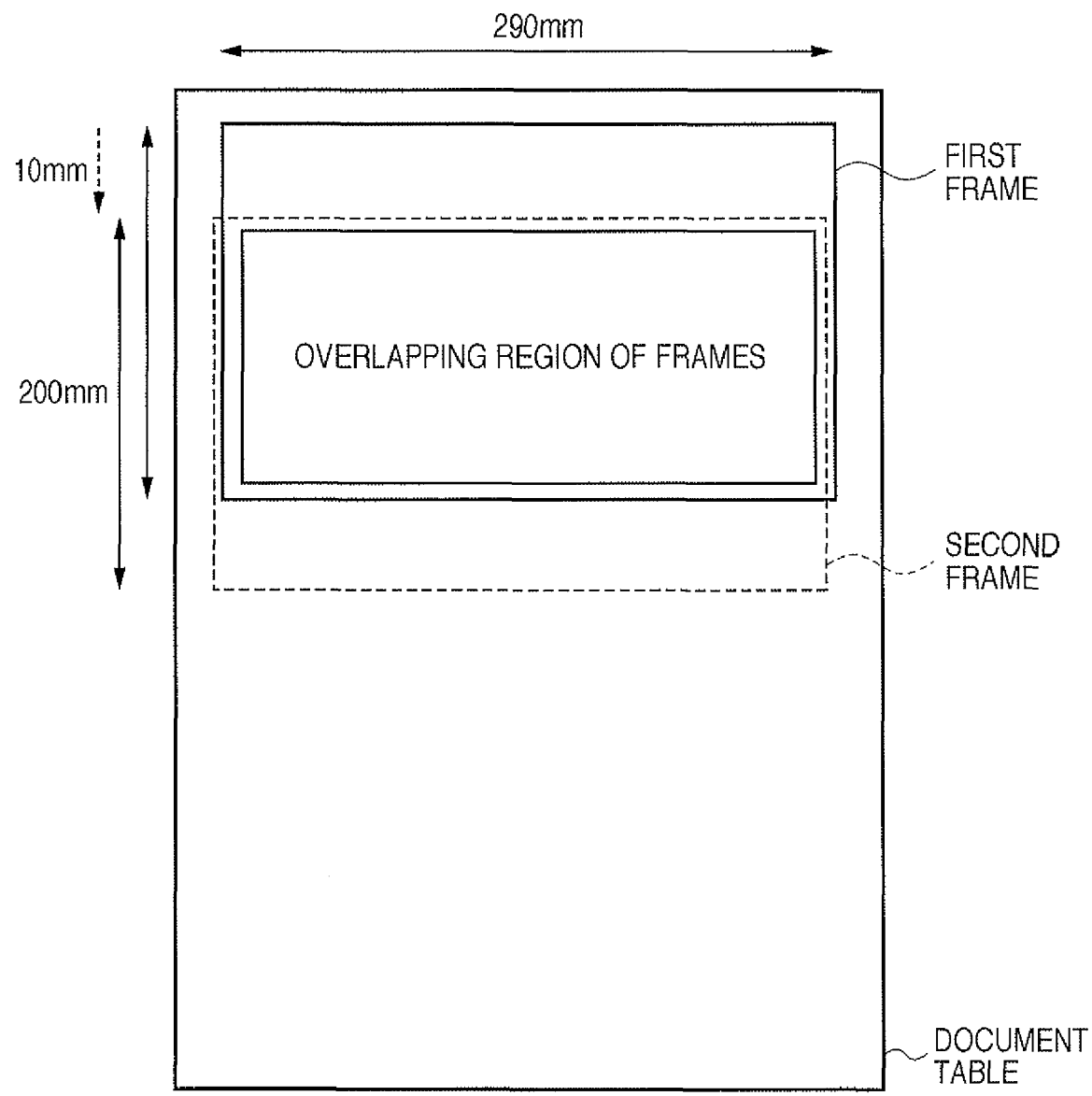
FIG. 24 is a view showing the relationship between image data obtained by executing the reading operation of the CCD area image sensor within the range of a document, and the coarse and dense parts of image data.
Figure 25:
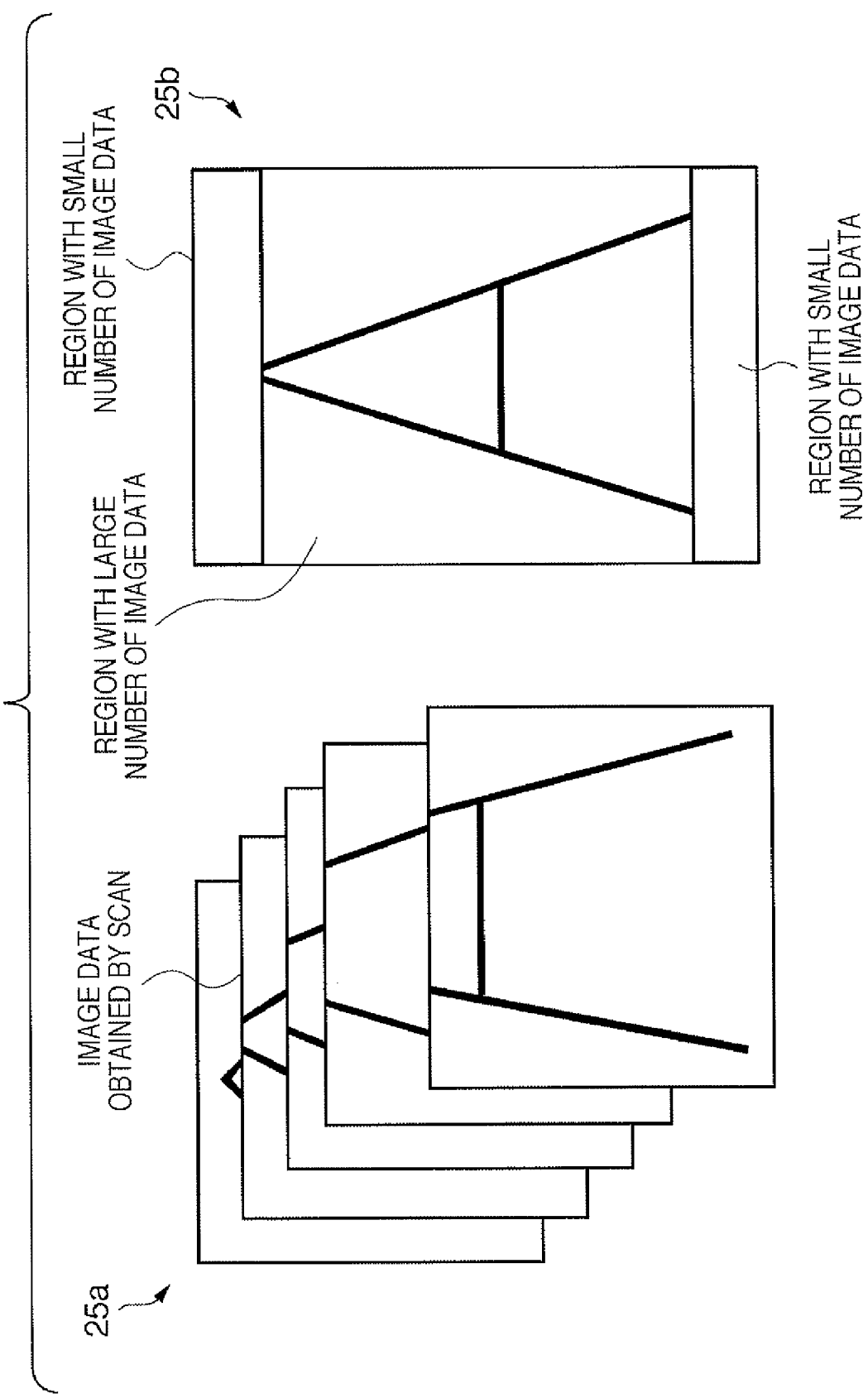
FIG. 25 shows an overlapping region when the CCD area image sensor executes a reading operation.

When the reading optical system moves in increments of 10 mm as in the first embodiment, for example, the first line in FIG. 23 moves from a 0-mm position at the top end of a document to a 200-mm position from the bottom end of the document in increments of 10 mm. On the other hand, the 780th line moves from a 200-mm position from the top end of the document to a 0-mm position at the bottom end of the document in increments of 10 mm. That is, from the first line to the 780th line, image data defined by 1140 pixels (about 100 dpi) in the main scanning direction and 20 pixels (=200 mm/10 mm) (about 2.5 dpi) in the sub scanning direction is generated.

However, since the processing in the third embodiment is executed in the same sequence as that shown in FIG. 18, a description will be given with reference to FIG. 18. In case of the third embodiment as well, the data processor 301 executes the above processing based on the program stored in the ROM 307.

Upon reception of a document read instruction and a target resolution selection instruction from the user interface 300 or LAN controller 305 in FIG. 3, the processing starts in step S1801 in FIG. 18. Note that the following description will also be given to have the target resolution=2400 dpi. However, the present invention is not limited to 2400 dpi, and target resolutions other than 2400 dpi can be selected. Also, the following description will be given under the assumption that the resolution of the CCD area image sensor 209 used in the image processing apparatus 100 according to this embodiment is 100 dpi. However, CCD area image sensors other than 100 dpi may be used.

In step S1802, the reading operation is executed. More specifically, the CCD area image sensor 209 reads a document and generates 780 image data each having 1140 pixels in the main scanning direction, as described above.

In the scanner unit 110, light emitted by the illumination device 204 is reflected by a document on the document table, and is further reflected by the mirrors 205 to 207. The light is focused by the lens 208, and is then received by the CCD area image sensor 209.

Note that the CCD area image sensor 209 converts the received optical signal into an analog voltage, and dot-sequentially outputs the analog voltage to the controller 216 via the cable 210.

In step S1803, the controller 216 converts the received analog voltage into digital data and generates image data of 1140 pixels×780 pixels. In step S1804, the controller 216 stores the generated image data in the RAM 306.

In step S1805, the reading position is moved. Assume that the moving distance at that time is predetermined (however, the moving distance may be changed based on the designated target resolution). In this embodiment, assume that the moving distance is set to be about 10 mm.

The reading position is moved when the reading optical unit 203 moves as a result of outputting a control signal from the data processor 301 to the motor driving control circuit 215 and driving the stepping motor 212.

With this operation, the position of the document to be read by the CCD area image sensor 209 upon execution of the next reading operation moves 10 mm in the sub scanning direction.

When it is determined in step S1806 that the reading position has reached the document terminal end, 780 image data of 1140 pixels×20 pixels are generated.

However, the coarse and dense parts of image data remain unchanged from the first embodiment. That is, the data amounts of the upstream and downstream parts of the document are small, and that of the document central part of the image data is large.

Note that the dense part (central part in the sub scanning direction) of image data can be converted into super-resolution image data of 2400 dpi by the super-resolution processing. On the other hand, the data amounts of upstream and downstream parts of image data are not enough to be converted into 2400-dpi data. Note that the 780 image data stored in step S1804 are expressed by img[m] (m=0 to 779).

In step S1807, an initial value "0" is set in a variable L (L=0). The variable L indicates the position on the document in the sub scanning direction where the super-resolution processing is executed. In case of this embodiment, there are sub scanning positions 0 to 20. Since the reading operation is executed while moving in increments of 10 mm, the first and third embodiments have the same region divisions.

In step S1808, the value of the main scanning LUT table (H_TBL[L]) 303 according to the value of L is read, and is stored in a variable hmag. 19a in FIG. 19 shows a practical example of the H_TBL 303. As shown in 19a in FIG. 19, upon reception of a sub scanning position (L), the H_TBL 303 outputs a resolution feasible in the main scan direction.

In step S1809, the value of the sub scanning LUT table (V_TBL[L]) 304 according to the value of L is read, and is stored in a variable vmag. 19b in FIG. 19 shows a practical example of the V_TBL 304. As shown in 19b in FIG. 19, upon reception of a sub scanning position (L), the V_TBL 304 outputs a resolution feasible in the sub scanning direction.

In step S1810, image data to be used in the super-resolution processing are determined. As described above, at the end part of the document, only one image data can be selected. However, for the central part, a maximum of 780 image data can be selected.

In step S1811, actually designated N image data img[m] are read. In step S1812, the super-resolution processing is executed for the read image data. At this time, one super-resolution image data is generated by executing the super-resolution processing at the resolutions hmag and vmag.

In step S1813, as resolution conversion processing to be executed when the resolution of the super-resolution image data generated in step S1812 does not reach 2400 dpi as the target resolution of the super-resolution processing, variable-magnification processing is executed in both the main scanning direction and sub scanning direction. As this variable-magnification processing, a generally used method, for example, a bicubic method is used.

However, the variable-magnification processing is not limited to such specific methods, and the resolution is converted into 2400 dpi using suited variable-magnification processing. Note that a variable magnification ratio used in step S1813 can be calculated by (2400 dpi−hmag)÷hmag in the main scanning direction, and by (2400 dpi−vmag)÷vmag in the sub scanning direction.

20a and 20b in FIG. 20 show the ratio between the super-resolution processing and variable-magnification processing in the aforementioned resolution conversion processing. The ratio between the super-resolution processing and variable-magnification processing changes depending on the positions in the sub scanning direction where the resolution conversion processing is executed, thus realizing a resolution of 2400 dpi as the target resolution at all the sub scanning positions.

For example, since hmag=800 dpi and vmag=600 dpi at the sub scanning position L in FIG. 20, the respective variable magnification ratios are:

Main scanning variable magnification ratio=(2400 dpi−800 dpi)/800 dpi=200%

Sub scanning variable magnification ratio=(2400 dpi−600 dpi)/600 dpi=300%

It is checked in step S1814 if the resolution conversion processing is complete until the last line (L=780). If it is determined that the processing is not complete yet, L is incremented. If it is determined that the processing is complete, the process advances to step S1816.

In step S1816, the (780) image data at the positions L=0 to 780 that have undergone the resolution conversion processing are composited according to the positions of the image data in the sub scanning direction. As a result, super-resolution image data can be generated from a plurality of low-resolution image data.

As can be seen from the above description, in this embodiment, upon generating image data used in the super-resolution processing, the CCD area image sensor is operated within the range of the document size. Then, as for the upstream and downstream parts of the document for which the target resolution cannot be realized by only the super-resolution processing, the variable-magnification processing is applied to realize the target resolution.

As a result, a desired resolution can be realized by a small footprint.

Other Embodiments

Note that the present invention may be applied to either a system constituted by a plurality of devices (e.g., a host computer, interface device, reader, and printer), or an apparatus consisting of a single device (e.g., a copying machine or facsimile apparatus).

The objects of the present invention are also achieved by supplying a computer-readable storage medium, which records a program code of software that implements the functions of the aforementioned embodiments to the system or apparatus. In this case, the functions are implemented when a computer (or a CPU or MPU) of the system or apparatus reads out and executes the program code stored in the storage medium. Note that the storage medium that stores the program code constitutes the present invention in such case.

As the storage medium for supplying the program code, for example, a Floppy® disk, hard disk, optical disk, magneto-optical disk, CD-ROM, CD-R, magnetic tape, nonvolatile memory card, and ROM may be used.

The present invention is not limited to the case in which the functions of the aforementioned embodiments are implemented when the computer executes the readout program code. For example, the present invention also includes a case in which an OS (operating system) or the like running on a computer may execute some or all of actual processes based on an instruction of the program code to implement the functions of the aforementioned embodiments.

Furthermore, the present invention also includes a case in which the functions of the aforementioned embodiments are implemented after the program code read out from the storage medium is written in a memory equipped on a function expansion board or unit, which is inserted in or connected to the computer. That is, the present invention includes a case in which after the program code is written in the memory, a CPU or the like equipped on the function expansion board or unit executes some or all of actual processes based on an instruction of the program code, so as to implement the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-126453 filed on May 13, 2008, which is hereby incorporated by reference herein in its entirety.

What is claimed is:

1. An image processing apparatus for processing a plurality of image data acquired by reading a document at a plurality of reading positions displaced from each other in a main scanning direction and a sub scanning direction, wherein the number of image data acquired for the respective positions of the document in the sub scanning direction is different, comprising:
   an inputting unit configured to input a target resolution;
   a super-resolution processing unit configured to execute super-resolution processing using a first number of image data acquired with the document in a first position in the sub scanning direction, wherein the first number of image data acquired for the first position is sufficient to achieve the input target resolution; and
   a variable-magnification processing unit configured to execute variable-magnification processing using a second number of image data acquired with the document in a second position in the sub scanning direction, wherein the second number of image data is smaller than the first number of image data; and
   a generation unit configured to composite image data of the first position to which the super-resolution processing is executed and image data of the second position to which the variable-magnification processing is executed and generate image data of the target resolution input by the input unit from the read document.

2. The apparatus according to claim 1, further comprising a holding unit configured to hold a table that records a resolution in the case of executing the super-resolution processing using image data acquired for the respective positions of the document in the sub scanning direction,
   wherein said variable-magnification processing unit determines a variable magnification ratio used upon execution of the variable-magnification processing for the second position by using the difference between the resolution held by said holding unit and the target resolution input by said inputting unit.

3. The apparatus according to claim 1, further comprising a filtering unit configured to execute filtering processing of image data composited by said composition unit,
   wherein the filtering unit executes the filtering processing for the image data for the second position of the document in the sub-scanning direction, whose resolution does not reach the target resolution input by said inputting unit even after the super-resolution processing is executed on the image data, by using a filter which is weaker than a filter used for filtering processing for the image data for the first position of the document in the sub-scanning direction, whose resolution reaches the target resolution input by said inputting unit.

4. The apparatus according to claim 1, wherein a filtering unit changes a strength of filtering depending on positions of the image data.

5. The apparatus according to claim 1, further comprising an area image sensor for generating the plurality of image data,
   wherein said area image sensor operates within a range from a top end portion of the document in the sub scanning direction to a bottom end portion in the sub scanning direction.

6. An image processing method in an image processing apparatus for processing a plurality of image data acquired by reading a document at a plurality of reading positions displaced from each other in a main scanning direction and a sub scanning direction, wherein the number of image data acquired for the respective positions of the document in the sub scanning direction is different, comprising:
   an inputting step of inputting a target resolution;
   a super-resolution processing step of executing super-resolution processing using a first number of image data acquired with the document in a first position in the sub scanning direction, wherein the first number of image data is sufficient to achieve the input target resolution is acquired for the first position;
   a variable-magnification processing step of executing variable-magnification processing using a second number of image data acquired with the document in a second position in the sub scanning direction, wherein the second number of image data is smaller than the first number of image data; and
   a generating step of compositing image data of the first position to which the super-resolution processing is executed and image data of the second position to which the variable-magnification processing and generating image data of the target resolution input in the inputting step from the read document.

7. A non-transitory computer-readable storage medium storing a program for causing a computer to perform or instruct the performing of the image processing method recited in claim 6.

* * * * *